United States Patent
Segawa et al.

(10) Patent No.: US 7,183,681 B2
(45) Date of Patent: Feb. 27, 2007

(54) ELECTRIC POWER STEERING APPARATUS

(75) Inventors: Toru Segawa, Gunma-ken (JP); Yushi Momo, Gunma-ken (JP); Hiroshi Eda, Gunma-ken (JP); Takayoshi Kanazawa, Gunma-ken (JP); Masaru Wada, Gunma-ken (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 0 days.

(21) Appl. No.: 11/115,332

(22) Filed: Apr. 27, 2005

(65) Prior Publication Data

US 2005/0183902 A1 Aug. 25, 2005

Related U.S. Application Data

(63) Continuation-in-part of application No. PCT/JP2003/014000, filed on Oct. 31, 2003.

(30) Foreign Application Priority Data

| Oct. 31, 2002 | (JP) | 2002-318745 |
| Oct. 31, 2002 | (JP) | 2002-318756 |
| Oct. 31, 2002 | (JP) | 2002-318765 |
| Apr. 21, 2003 | (JP) | 2003-115379 |

(51) Int. Cl.
  *H02K 11/00* (2006.01)
(52) U.S. Cl. ................ 310/68 B; 310/98
(58) Field of Classification Search ............ 310/71, 310/68 B, 89–90, 98–99, 216, 254
See application file for complete search history.

(56) References Cited

U.S. PATENT DOCUMENTS

| 5,595,089 A | 1/1997 | Watanabe et al. ........ 74/89.15 |
| 6,577,030 B2 * | 6/2003 | Tominaga et al. ........ 310/68 B |
| 2001/0017498 A1 | 8/2001 | Matsuoka et al. ........... 310/90 |
| 2002/0047460 A1 | 4/2002 | Yoneda et al. ............. 310/216 |

FOREIGN PATENT DOCUMENTS

| EP | 0 667 279 | 8/1995 |
| JP | 5-103439 | 4/1993 |
| JP | (UM) 5-95152 | 12/1993 |
| JP | 7-215226 | 8/1995 |

(Continued)

*Primary Examiner*—Thanh Lam
(74) *Attorney, Agent, or Firm*—Miles & Stockbridge PC

(57) ABSTRACT

In an electric power steering apparatus that generates an auxiliary steering torque by a brushless motor in response to a steering torque applied on a steering wheel and transmits it to an output shaft of a steering mechanism while reducing it by means of a reduction gear, the apparatus comprises a rotor (10) to which a cylindrical permanent magnet for rotational driving (12) and a member to be detected (13) for detection of a rotational angle of the rotor are attached and a cylindrical stator (30) opposed to the rotor in which a laminated core (16) on which a coil is wound, detection means (17) for detecting the rotational angle of the rotor by the member to be detected and a terminal (19) for providing connection to the coil are integrally formed by resin molding. At least one bearing (8, 9) for rotatably supporting the rotor is disposed radially inside the stator and between the permanent magnet for rotational driving and the member to be detected.

9 Claims, 14 Drawing Sheets

FOREIGN PATENT DOCUMENTS

| | | |
|---|---|---|
| JP | 10-271720 | 10/1998 |
| JP | 11-332136 | 11/1999 |
| JP | 2001-238396 | 8/2001 |
| JP | 2001-275325 | 10/2001 |
| JP | 2002-291181 | 10/2002 |
| JP | 2002-345211 | 11/2002 |
| JP | 2002-354755 | 12/2002 |
| WO | WO 99/65758 | 12/1999 |

* cited by examiner

FRONT SIDE    REAR SIDE

REAR SIDE

FRONT SIDE

REAR SIDE

FRONT SIDE

REAR SIDE

FRONT SIDE

ELECTRIC POWER STEERING APPARATUS

CROSS-REFERENCE TO RELATED APPLICATION

This application is a continuation-in-part of International Application No. PCT/JP2003/014000 filed Oct. 31, 2003.

TECHNICAL FIELD

The present invention relates to an electric power steering apparatus for a vehicle and a brushless motor suitably used in that apparatus.

BACKGROUND ART

In a known electric power steering apparatus for a vehicle, rotational output of an electric motor for providing an auxiliary steering torque is transmitted, while reduced, to an output shaft of the steering apparatus by a gear apparatus to assist the steering force applied to the steering wheel in the wheel steering operation. In such an electric power steering apparatus, the power is transmitted to the output shaft while the rotation of the electric motor is reduced by a power transmission mechanism provided in the housing.

The mainstream electric motor used in such power steering apparatuses used to be a motor having a brush. However, in recent years, it has been shifting to a brushless motor in order to improve reliability and to further enhance efficiency.

An electric power steering apparatus in which a brushless motor is employed is shown in FIG. 16. The output shaft 1 is coupled with, via a torsion bar (not shown) etc., an input shaft (not shown) that is, in turn, coupled with the steering wheel (not shown), and a worm wheel 2 of a worm gear reduction mechanism is fixedly attached on the output shaft 1.

A worm 5 rotatably supported on a gear housing 3 by means of a bearing 4 etc. is in engagement with the worm wheel 2.

With the gear housing 3, a motor cover 7 for the brushless motor is coupled via a flange serving as a partition plate. The rotor 10 of the brushless motor is rotatably supported on the flange 6 and the motor cover 7 via bearings 8 and 9 respectively. The rotor 10 and the worm 5 are linked by means of a spline fitting portion 11 so that they are movable in the axial direction but non-rotatable relative to each other.

In the radially outer periphery of the rotor 10, there is provided a cylindrical permanent magnet 12 for rotational driving in such a way as to be opposed to a laminated core 16. In addition, a ring-shaped permanent magnet for sensing 13 is also provided.

Radially inside the motor cover 7, a cylindrical stator 14 is provided. The stator 14 is formed by resin molding integrally including the laminated core 16 on which a coil 15 is wound, a hall IC 17 for detecting magnetism of the permanent magnet for sensing 13, a board 18 on which the hall IC 17 is mounted and a terminal (busbar) 19 for providing connection for the coil 15.

To the terminal (busbar) 19, an electric cable 20 for a terminal connected with the coil 15 and for a terminal for outputting a signal of the hall IC 17 is joined by soldering or other means.

In recent years, with an increase in the types of vehicles in which electric power steering apparatuses are to be employed, the output power demanded for the power steering apparatus has been increasing. Thus, an increase in the output power of the motor is demanded, and on the other hand, downsizing thereof is also demanded for the purpose of space-saving.

If the hall IC 17 is disposed at a position too closed to the coil 15, a malfunction of the hall IC can occur due to the magnetism generated by the coil 15. Accordingly, it is necessary to dispose the hall IC with a certain distance (a certain space) from the coil 15. Therefore, it is difficult to reduce the length of the motor.

Furthermore, it is necessary to provide a bracket and flange for supporting the bearings 8, 9 on the outer periphery or the end faces of the stator 14, and therefore it is difficult to reduce the axial length of the rotor 10 with the bearings 8, 9.

International publication WO99/65758 discloses a brushless motor in which a common bearing is used for the rotor and the worm in order to reduce the length of the motor.

However, in that arrangement, the axial position of the rotor will be displaced with variations in the load of the worm, which results in problems such as generation of vibration or changes in characteristics. In addition, the assembly operation is required to be carried out under strict control in order to prevent attachment of iron dust etc. to the rotor provided with a permanent magnet for rotational driving, and it is necessary to assemble the rotor and the stator separately. Thus, there arise problems such as a deterioration in ease of the assembly operation and an increase in the process steps in the assembly operation. Furthermore, the motor cannot be subjected to inspection until assembly of the worm gear mechanism and the brushless motor has been finished, that is, inspection in terms of its performance etc. cannot be performed for the motor in a stand alone state.

In the electric power steering apparatus shown in FIG. 16, in the boundary space between the worm gear mechanism and the brushless motor, there is provided the aforementioned flange 6 (partition plate) and the bearing 8 mounted on the radially inner circumference of the flange (partition plate).

Therefore, if grease or foreign matters such as iron dust in the worm gear mechanism are about to enter the brushless motor, entry of the foreign matters and grease can be prevented by the seal achieved by the aforementioned flange 6 (partition plate) and the bearing 8.

On the other hand, if downsizing of the brushless motor is intended, a structure in which the aforementioned bearing 8 is eliminated or a structure in which the mount position of the bearing 8 is changed may be adopted.

However, if the bearing 8 is eliminated or the position thereof is changed, the boundary portion between the worm gear mechanism and the brushless motor becomes open, and the worm gear mechanism and the brushless motor are in communication with each other. As a result, there is a risk that grease or foreign matters such as iron dust in the worm gear mechanism will enter the brushless motor.

Furthermore, brushless motors formed by resin molding have been desired from the standpoint of downsizing of the electric power steering apparatus, motor noise reduction or facilitating heat radiation of the motor.

However, there are no motors formed by molding employed in electric power steering apparatuses presently, though driving motors used in ventilators of consumer electrical appliances are generally motors formed by molding.

A motor formed by molding used for driving a ventilator will be described with reference to FIGS. 17A and 17B (see page 2 and FIGS. 1, 2, 9 and 10 of Japanese Patent Application Laid-Open No. 10-271720, for example). FIG. 17A shows a motor 200 for a ventilator as viewed from obliquely above, and FIG. 17B is a cross sectional view of the motor 200. In FIGS. 17A and 17B, a stator 201 is molded with synthetic resin 204 in such a way as to envelop a stator iron core 202 and winding 203. On the other hand, to a rotor 208 integral with a shaft 211, a permanent magnet 209 is attached. They are housed in the stator 201, and the shaft 211 is supported by a bearing 206 received in a bearing housing 205 and a bearing 214 received in a bearing bracket 213. In this bearing structure, although it is difficult to achieve a high coaxiality of the stator 201 and the rotor 208, its application as a motor for a ventilator of a consumer electric appliance does not require precision more than necessary in the coaxiality.

If a brushless motor for an electric power steering apparatus having a structure similar to the above-described motor for a ventilator is formed by molding, the problem described below will arise. In the case of the motor for an electric power steering apparatus, when the steering wheel is turned in one direction then the other upon driving the vehicle to a parking space or when the steering wheel is turned quickly at a critical moment, the motor is required to rotate in forward and backward directions with a large torque. Therefore, extremely high precision in the coaxiality is demanded in order to suppress noises and torque ripples.

In the bearing support structure for the rotor provided with a bearing chamber formed by resin integral molding, it is generally difficult to enhance precision of the bearing chamber due to variations in conditions during the molding, differences in the contraction percentage depending on the resin molding directions, weld or other reasons. In the case that the precision of the bearing chamber is low or its coaxiality with the inner circumference of the stator is low, the coaxiality of the cylindrical stator and the cylindrical rotor inserted and adapted to rotate therein is deteriorated. This invites, as consequences, an increase in the cogging torque, an increase in the friction torque and an increase in the motor noises. The increase in the cogging torque will be transmitted to the driver's hands directly to give him/her unpleasant feeling, and the increase in the friction torque leads not only to a motor power loss but also to deterioration of response characteristics to the motor control signal.

DISCLOSURE OF THE INVENTION

The present invention has been made in view of the above-described circumstances. A first object of the invention of the present application is to provide an electric power steering apparatus in which a length reduction is made possible without deterioration in its performance and ease of assembly.

To achieve the aforementioned first object, according to a first invention of the present application, there is provided an electric power steering apparatus that generates an auxiliary steering torque by a brushless motor in response to a steering torque applied on a steering wheel and transmits it to an output shaft of a steering mechanism while reducing it by means of a reduction gear, comprising:

a rotor to which a cylindrical permanent magnet for rotational driving and a member to be detected for detection of a rotational angle of said rotor are attached;

a cylindrical stator opposed to said rotor in which a laminated core on which a coil is wound, detection means for detecting the rotational angle of said rotor by said member to be detected and a terminal for providing connection to the coil are integrally formed by resin molding; and at least one bearing for rotatably supporting said rotor disposed radially inside said stator and between said permanent magnet for rotational driving and said member to be detected.

As per the above, according the first invention, at least one bearing for rotatably supporting the rotor is disposed radially inside the stator and between the permanent magnet for rotational driving and the member to be detected. In other words, the bearing is disposed in a space provided for preventing a malfunction between the detection means and the coil. This makes it possible to reduce the length of the rotor and the length of the brushless motor.

Furthermore, in the case that the bearing is disposed in the space provided for preventing a malfunction between the detection means and the coil and the bearing is made of a magnetic substance, the bearing will form a magnetic path that confines magnetic fluxes generated by the coil, whereby effects of magnetic fluxes generated by the coil exerted on the detection means are made small and the sensitivity of the detection means can be improved.

In the electric power steering apparatus according to the first invention, it is preferable that the inner diameter of said stator vary stepwise along the axial direction. According to this preferred mode, the inner diameter of said stator varies stepwise along the axial direction. In other words, the inner diameter of the stator is large at its open side and varies stepwise from a larger diameter to a smaller diameter toward the inner side. Accordingly, after resin molding and hardening, the core metal of a metal mold can be pulled out without being caught, and it is possible to remove the mold smoothly.

The inner diameter of said stator varies stepwise along the axial direction, namely the inner diameter of the stator is large at its open side and varies stepwise from a larger diameter to a smaller diameter toward the inner side. Accordingly, the rotor with the bearing mounted thereon can be inserted from the open side having the largest diameter, and ease of assembly can be improved.

Accordingly, in the assembly process, the brushless motor can be assembled to a worm gear mechanism after finishing the assembly of the brushless motor alone. Therefore, ease of assembly is not deteriorated, and it is possible to inspect the performance etc. of the brushless motor in a stand alone state.

Furthermore, in the electric power steering apparatus according to the first invention, it is preferable that said stator integrally include an electric cable connection terminal. According to this preferred mode, the stator integrally includes a cable connection terminal. Namely, since the electric cable connection terminal (connector) for a terminal connected with the coil and for a terminal for outputting a signal of the detection means is integrally formed in the stator, the operation of connecting an electric cable by soldering or other means that has been conventionally required can be eliminated, so that the number of the parts and the number of the steps in the assembly process can be reduced.

Furthermore, in the electric power steering apparatus according to the first invention, it is preferable that said member to be detected be disposed on the end portion of the rotor that is opposite to the motor output side end portion. According to this preferred mode, by disposing the member to be detected on the end portion of the rotor that is opposite to the motor output side end portion, interfering portions of a gear housing and the cable connection terminal are eliminated, and it is possible to make the shape simple and to improve dustproof and waterproof performance, so that it is possible to prevent iron dust etc. from entering the interior during assembly of the motor in a stand alone state.

Furthermore, in the electric power steering apparatus according to the first invention, it is preferable that said stator has, on its outer surface, a flange for mounting said brushless motor to said reduction gear, and the flange be disposed near the center along the longitudinal axis of the stator. According to this preferred mode, the stator has, on its outer surface, a flange to be mounted on the reduction gear. Accordingly, the brushless motor can be mounted on the reduction gear by means of the flange of the stator, and a conventional motor cover made of a metal and a mounting flange therefor can be eliminated. Thus, it is possible to reduce the number of the parts and the number of the steps in the assembly process and to reduce the manufacturing cost. In addition, by providing the flange at a position near the center along the axial direction of the stator, it is possible to reduce the distance between the center of gravity of the motor and the flange, to thereby reduce forces generated in the flange due to vibration and other causes. Thus, the required strength of the flange can be reduced, namely its weight and size may be reduced.

To achieve the aforementioned first object, according to a second invention, there is provided an electric power steering apparatus that generates an auxiliary steering torque by a brushless motor in response to a steering torque applied on a steering wheel and transmits it to an output shaft of a steering mechanism while reducing it by means of a reduction gear, comprising:

a rotor to which a cylindrical permanent magnet for rotational driving and a member to be detected for detection of a rotational angle of said rotor are attached;

a cylindrical stator opposed to said rotor in which a laminated core on which a coil is wound, detection means for detecting the rotational angle of said rotor by said member to be detected and a terminal for providing connection to the coil are integrally formed by resin molding; and two bearings supported on said stator for rotatably supporting said rotor.

As per the above, according to the second invention, since the two bearings for rotatably supporting the rotor are supported on the stator, the radial gap between the laminated core of the stator and the rotor can be kept strictly constant. Thus, it is possible to reduce transmission of vibrations etc. to ensure stable performance all the time while keeping quietness.

In addition, since the stator is integrally molded with a resin in such a way as to cover the coil, the laminated core, the detection means, and the terminal, it can also play the role of a conventional motor cover made of a metal. Therefore, the brushless motor can be mounted on the reduction gear by means of the stator, and the conventional motor cover made of a metal can be eliminated. Thus, it is possible to reduce the number of the parts and the number of the steps in the assembly process and to reduce the manufacturing cost.

In the electric power steering apparatus according to the second invention, it is preferable that said stator has a closing wall that closes an opening at the side opposite to the reduction gear and retains one of said two bearings. According to this preferred mode, the stator has a closing wall that closes an opening at the side opposite to the reduction gear and retains one of the two bearings. Accordingly, the one bearing can be mounted on the closing wall easily.

Furthermore, in the electric power steering apparatus according to the second invention, it is preferable that the other of said two bearings be disposed radially inside said stator and between said permanent magnet for rotational driving and said member to be detected. According to this preferred mode, the other of the two bearings is disposed radially inside the stator and between the permanent magnet for rotational driving and the member to be detected. In other words, the bearing is disposed in a space provided for preventing a malfunction between the detection means and the coil. This makes it possible to reduce the length of the rotor and the length of the brushless motor.

Furthermore, in the case that the bearing is disposed in the space provided for preventing a malfunction between the detection means and the coil and the bearing is made of a magnetic substance, the bearing will form a magnetic path that confines magnetic fluxes generated by the coil, whereby effects of magnetic fluxes generated by the coil exerted on the detection means are made small and the sensitivity of the detection means can be improved.

In the electric power steering apparatus according to the second invention, it is preferable that the inner diameter of said stator vary stepwise along the axial direction. According to this preferred mode, the inner diameter of said stator varies stepwise along the axial direction. In other words, the inner diameter of the stator is large at its open side and varies stepwise from a larger diameter to a smaller diameter toward the inner side. Accordingly, after resin molding and hardening, the core metal of a metal mold can be pulled out without being caught, and it is possible to remove the mold smoothly.

The inner diameter of said stator varies stepwise along the axial direction, namely the inner diameter of the stator is large at its open side and varies stepwise from a larger diameter to a smaller diameter toward the inner side. Therefore, the rotor with the bearing mounted thereon can be inserted from the open side having the largest diameter, and ease of assembly can be improved.

Accordingly, in the assembly process, the brushless motor can be assembled to the reduction gear after finishing the assembly of the brushless motor alone. Therefore, ease of assembly is not deteriorated, and it is possible to inspect the performance etc. of the brushless motor in a stand alone state.

Furthermore, in the electric power steering apparatus according to the second invention, it is preferable that said stator integrally include an electric cable connection terminal. According to this preferred mode, the stator integrally includes a cable connection terminal. Namely, since the electric cable connection terminal (connector) for a terminal connected with the coil and for a terminal for outputting a signal of the detection means is integrally formed in the stator, the operation of connecting an electric cable by soldering or other means that has been conventionally required can be eliminated, so that the number of the parts and the number of the steps in the assembly process can be reduced.

Furthermore, in the electric power steering apparatus according to the second invention, it is preferable that the aforementioned stator has, on its outer surface, a flange to be mounted on said reduction gear, and the flange be disposed near the center along the longitudinal axis of the stator. According to this preferred mode, the stator has, on its outer surface, a flange to be mounted on the reduction gear. Accordingly, the brushless motor can be mounted on the reduction gear by means of the flange of the stator, and a conventional motor cover made of a metal and a mounting flange therefor can be eliminated. Thus, it is possible to reduce the number of the parts and the number of the steps in the assembly process and to reduce the manufacturing cost. In addition, by providing the flange at a position near the center along the axial direction of the stator, it is possible to reduce the distance between the center of gravity of the motor and the flange, to thereby reduce forces generated in the flange due to vibration and other causes. Thus, the required strength of the flange can be reduced, namely its weight and size may be reduced.

Furthermore, in the electric power steering apparatus according to the second invention, it is preferable that the aforementioned member to be detected be disposed on the end portion of the rotor that is opposite to the motor output side end portion. According to this preferred mode, by disposing the member to be detected on the end portion of the rotor that is opposite to the motor output side end portion, interfering portions of a gear housing and the cable connection terminal are eliminated, and it is possible to make the shape simple and to improve dustproof and waterproof performance, so that it is possible to prevent iron dust etc. from entering the interior during assembly of the motor in a stand alone state.

An second object of the invention of the present application is to provide an electric power steering apparatus that can reliably prevent foreign matters such as iron dust and grease in a reduction gear from entering the interior of an electric motor.

To achieve the aforementioned second object, according to a third invention of the present application, there is provided an electric power steering apparatus that generates an auxiliary steering torque by an electric motor in response to a steering torque applied on a steering wheel and transmits it to an output shaft of a steering mechanism while reducing it by means of a reduction gear, the apparatus having a shield member for shielding a boundary portion between said reduction gear and said electric motor, the shielding member being attached to a rotor of said electric motor to rotate with the rotor and leaving a predetermined small gap between it and a stationary portion of said electric motor or said reduction gear.

As per the above, according to the third invention, the apparatus is provided with a shielding member for shielding a boundary portion between the reduction gear and the electric motor, and the shielding member is attached to the rotor of the electric motor to rotate with the rotor and leaving a predetermined small gap between it and a stationary portion of the electric motor or the reduction gear. Accordingly, even if foreign matters such as iron dust and grease are about to enter the electric motor, entry of the foreign matters and the grease can be reliably prevented by the shield member.

In the electric power steering apparatus according to the third invention, it is preferable that said shield member and the stationary portion of said electric motor or said reduction gear form, in cooperation, a predetermined small gap therebetween that has a labyrinth effect. According to this preferred mode, since the shield member and the stationary portion of the electric motor or the reduction gear form, in cooperation, a predetermined small gap therebetween that has a labyrinth effect, it is possible to prevent entry of foreign matters and grease with more enhanced reliability.

Furthermore, in the electric power steering apparatus according to the third invention, it is preferable that said electric motor be a brushless motor, a cylindrical permanent magnet for rotational driving and a member to be detected for detection of a rotational angle of said rotor be attached to said rotor, and the apparatus have a cylindrical stator opposed to said rotor in which a laminated core on which a coil is wound, detection means for detecting the rotational angle of said rotor by said member to be detected, a terminal for providing connection to the coil and a cylindrical resin housing portion that covers said coil, said laminated core, said detection means and said terminal are integrally formed by resin molding, and two bearings for rotatably supporting said rotor be supported on said cylindrical resin housing portion. The detection means and the member to be detected used for detecting the angle of the rotor may be not only a hall IC and a permanent magnet but also a resolver and inductcoder. According to this preferred mode, since the two bearings for rotatably supporting the rotor are supported on the cylindrical resin housing portion, the radial gap between the laminated core of the stator and the rotor can be kept strictly constant. Thus, it is possible to reduce transmission of vibrations etc. to ensure stable performance all the time while keeping quietness.

In addition, according to this preferred mode, since the cylindrical resin housing portion is integrally molded with a resin in such a way as to cover the coil, the laminated core, the detection means, and the terminal, it can also play the role of a conventional motor cover made of a metal. Therefore, the brushless motor can be mounted on the reduction gear by means of the cylindrical resin housing portion, and the conventional motor cover made of a metal can be eliminated. Thus, it is possible to reduce the number of the parts and the number of the steps in the assembly process and to reduce the manufacturing cost.

In the electric power steering apparatus according to the third invention, it is preferable that said cylindrical resin housing portion have a closing wall that closes an opening at the side opposite to the reduction gear and retains one of said two bearings. According to this preferred mode, the cylindrical resin housing portion has the closing wall that closes an opening at the side opposite to the reduction gear and retains one of the two bearings. Accordingly, the one bearing can be mounted on the closing wall easily.

Furthermore, in the electric power steering apparatus according to the third invention, it is preferable that the other of said two bearings be disposed radially inside said stator and between said permanent magnet for rotational driving and said member to be detected. According to this preferred mode, the other of the two bearings is disposed radially inside the stator and between the permanent magnet for rotational driving and the member to be detected. In other words, the bearing is disposed in a space provided for preventing a malfunction between the detection means and the coil. This makes it possible to reduce the length of the rotor and the length of the brushless motor. Furthermore, in this preferred mode, in the case that the bearing is disposed in the space provided for preventing a malfunction between the detection means and the coil and the bearing is made of a magnetic substance, the bearing will form a magnetic path that confines magnetic fluxes generated by the coil, whereby effects of magnetic fluxes generated by the coil exerted on the detection means are made small and the sensitivity of the detection means can be improved.

In the electric power steering apparatus according to the third invention, it is preferable that the inner diameter of said stator vary stepwise along the axial direction. According to this preferred mode, the inner diameter of said stator varies stepwise along the axial direction. In other words, the inner diameter of the stator is large at its open side and varies stepwise from a larger diameter to a smaller diameter toward the inner side. Accordingly, after resin molding and hardening, the core metal of a metal mold can be pulled out without being caught, and it is possible to remove the mold smoothly. The inner diameter of said stator varies stepwise along the axial direction, namely the inner diameter of the stator is large at its open side and varies stepwise from a larger diameter to a smaller diameter toward the inner side. Accordingly, the rotor with the bearing mounted thereon can be inserted from the open side having the largest diameter, and ease of assembly can be improved.

Accordingly, in the assembly process, the brushless motor can be assembled to the reduction gear after finishing the assembly of the brushless motor alone. Therefore, ease of assembly is not deteriorated, and it is possible to inspect the performance etc. of the brushless motor in a stand alone state.

Furthermore, in the electric power steering apparatus according to the third invention, it is preferable that said stator integrally include an electric cable connection terminal. According to this preferred mode, the stator integrally includes the cable connection terminal. Namely, since the electric cable connection terminal (connector) for a terminal connected with the coil and a terminal for outputting a signal of the detection means is integrally formed in the stator, the operation of connecting an electric cable by soldering or other means that has been conventionally required can be eliminated, so that the number of the parts and the number of the steps in the assembly process can be reduced.

Furthermore, in the electric power steering apparatus according to the third invention, it is preferable that said cylindrical resin housing have, on its outer surface, a flange to be mounted on said reduction gear. According to this preferred mode, the cylindrical resin housing portion has, on its outer surface, a flange to be mounted on the reduction gear. Accordingly, the brushless motor can be mounted on the reduction gear by means of the flange of the cylindrical resin housing portion, and a motor cover made of a metal that has been conventionally required and a mounting flange therefor can be eliminated. Thus, it is possible to reduce the number of the parts and the number of the steps in the assembly process and to reduce the manufacturing cost. In addition, by providing the flange at a position near the center along the axial direction of the stator, it is possible to reduce the distance between the center of gravity of the motor and the flange four mounting the motor, to thereby reduce forces generated in the flange due to vibration and other causes. Thus, the required strength of the flange can be reduced, namely its weight and size may be reduced.

A third object of the present invention as described above is to provide a brushless motor for an electric power steering apparatus in which precision in coaxiality of the inner diameter of a stator formed by molding and the center of a bearing of a rotor is improved, heat radiation ability is enhanced, noises are low while maintaining good steering wheel operation feeling.

According to a fourth invention for achieving the third object, there is provided a brushless motor comprising a cylindrical rotor and a cylindrical stator formed by resin molding as a whole inside which said rotor is inserted and received, wherein at least one bearing support member for fixing a bearing for supporting said rotor is provided on said stator, said bearing support member being formed by resin molding integrally with said stator.

In the brushless motor according to the fourth invention, in order to enhance coaxiality of said rotor and said stator, it is preferable that a boss be provided on said bearing support member, a notch be provided on an inner circumference, an outer circumference, an end face near the inner circumference or an end face near the outer circumference of a stator core that constitutes said stator, and said boss and said notch be fitted to improve coaxiality of said rotor and said stator.

Furthermore, it is preferable that said notch be provided at such a position that minimizes a variation of magnetic fluxes of said stator core caused by said notch. In addition, it is preferable that said notch be provided at such a position that minimizes a variation of magnetic fluxes of said stator core caused by said notch, and the position of said notch is on the center line of a tooth of said stator core.

In the brushless motor according to the fourth invention, in order to enhance coaxiality of said rotor and said stator, it is preferable that said bearing support member has a minimum inner diameter while allowing the outer diameter of a stator core that constitutes said stator to fit therein, and said bearing support member and said stator be fitted.

Furthermore, in the brushless motor according to the fourth invention, it is preferable that said bearing support member be made of a rigid material.

Preferably, said rigid material is an iron material, an aluminum material or a resin-based material. Preferably, said brushless motor is used in an electric power steering apparatus.

EMBODIMENTS OF THE INVENTION

In the following, electric power steering apparatuses as embodiments of the present invention will be described with reference to drawings.

Figure 1:
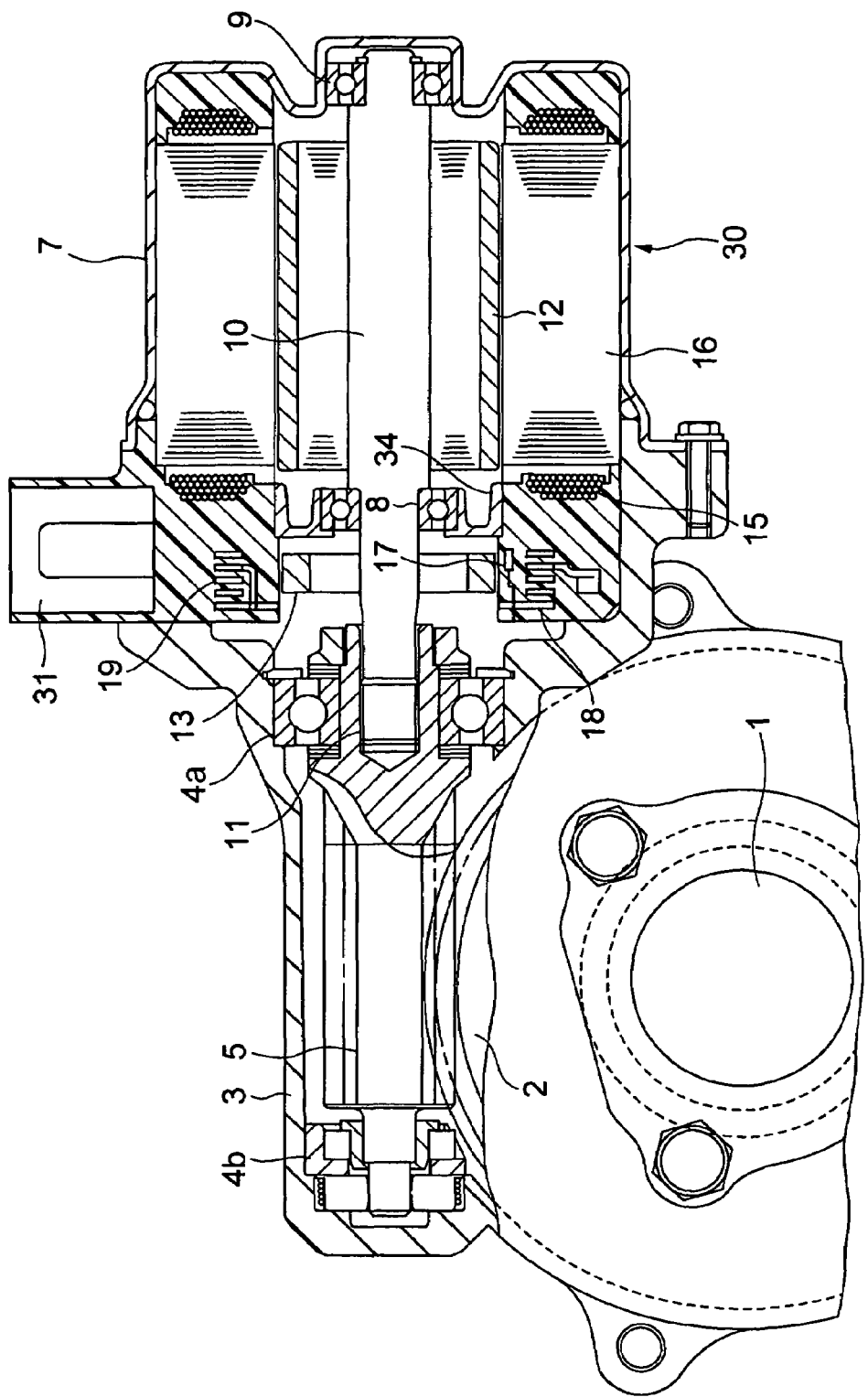
FIG. 1 is a longitudinal cross sectional view showing an electric power steering apparatus according to a first embodiment of the present invention.

FIG. 1 is a longitudinal cross sectional view showing an electric power steering apparatus according to the first embodiment of the invention.

As shown in FIG. 1, an output shaft 1 is linked with an input shaft (not shown), which is coupled with a steering wheel (not shown), by means of a torsion bar (not shown). A worm wheel 2 of a worm gear reduction mechanism is fixedly mounted on the output shaft 1.

A worm 5 rotatably supported in a gear housing 3 by bearings 4a and 4b is in engagement with the worm wheel 2.

The gear housing 3 is coupled with a motor cover 7 for a brushless motor. The rotor 10 of the brushless motor and the worm 5 are connected by means of a spline fitting portion 11 so that they are movable in the axial direction but non-rotatable relative to each other.

In the radially outer periphery of the rotor 10, there is provided a cylindrical permanent magnet 12 for rotational driving in such a way as to be opposed to a laminated core 16 that will be described later. In addition, a ring-shaped permanent magnet for sensing 13 (member to be detected) is also provided.

Radially inside the motor cover 7, a cylindrical stator 30 is provided. The stator 30 is formed by resin molding integrally with the laminated core 16 on which a coil 15 is wound, a hall IC 17 (detection means) that detects the magnetic field of the permanent magnet for sensing 13 (member to be detected) so as to detect the rotational angle of the rotor 10, a board 18 on which the hall IC 17 is mounted, a terminal (busbar) 19 for providing connection for the coil 15 and an electric cable connection terminal (connector) 31 for a terminal connected with the coil 15 and for a terminal for outputting a signal of the hall IC 17 (detection means).

The electric cable connection terminal (connector) 31 may be made of either the material same as the resin used in the molding or a different material.

In this embodiment, a bearing 8 for rotatably supporting the worm side portion of the rotor 10 is provided radially inside the stator 30 and between the permanent magnet for rotational driving 12 and the permanent magnet for sensing 13 (member to be detected).

Specifically, the bearing 8 is mounted on the radially inner side of the stator 30 formed by resin molding by means of a cylindrical bracket 34. Alternatively, the bearing 8 may be mounted directly on the radially inner side of the stator 30 without using the bracket 34.

On the motor cover 7, a bearing 9 for supporting the side of the rotor 10 that is opposite to the worm side is provided.

The bearing 8 is disposed in the space provided for preventing a malfunction between the hall IC 17 (detection means) and the coil 15. This makes it possible to reduce the length of the rotor 10 and the length of the brushless motor.

Furthermore, in the case that the bearing 8 is disposed in the space provided for preventing a malfunction between the hall IC 17 (detection means) and the coil 15 and the bearing 8 is made of a magnetic substance, the bearing 8 will form a magnetic path that confines magnetic fluxes from the coil 15, whereby effects of magnetic fluxes generated by the coil 15 exerted on the hall IC 17 (detection means) are made small and the sensitivity of the hall IC 17 (detection means) can be improved. The detection means and the member to be detected used for detecting the angle of the rotor 10 are not limited to the hall IC and the permanent magnet, but a resolver or an inductcoder etc. may be used.

The inner diameter of the stator 30 formed by resin molding varies stepwise along the axial direction. Specifically, the inner diameter of the stator 30 is large at its open side and varies stepwise from a larger diameter to a smaller diameter toward the inner side.

Accordingly, after the resin molding and hardening, the core metal of the metal mold can be pulled out without being caught, and it is possible to remove the mold smoothly.

Since the inner diameter of the stator 30 is large at its open side and varies stepwise from a larger diameter to a smaller diameter toward the inner side, the rotor 10 with the bearing 8 mounted thereon can be inserted from the open side having the largest diameter, and ease of assembly can be improved.

Accordingly, in the assembly process, the brushless motor can be assembled to the worm gear mechanism after finishing the assembly of the brushless motor alone. Therefore, ease of assembly is not deteriorated, and it is possible to inspect the performance etc. of the brushless motor in a stand alone state.

Furthermore, since in the stator 30 formed by resin molding, the electric cable connection terminal (connector) 31 for the terminal connected with the coil 15 and the terminal for outputting a signal of the hall IC (detection means) 17 is integrally molded with resin, the operation of connecting an electric cable by soldering or other means that has been conventionally required can be eliminated, so that the number of the parts and the number of the steps in the assembly process can be reduced.

Figure 2:
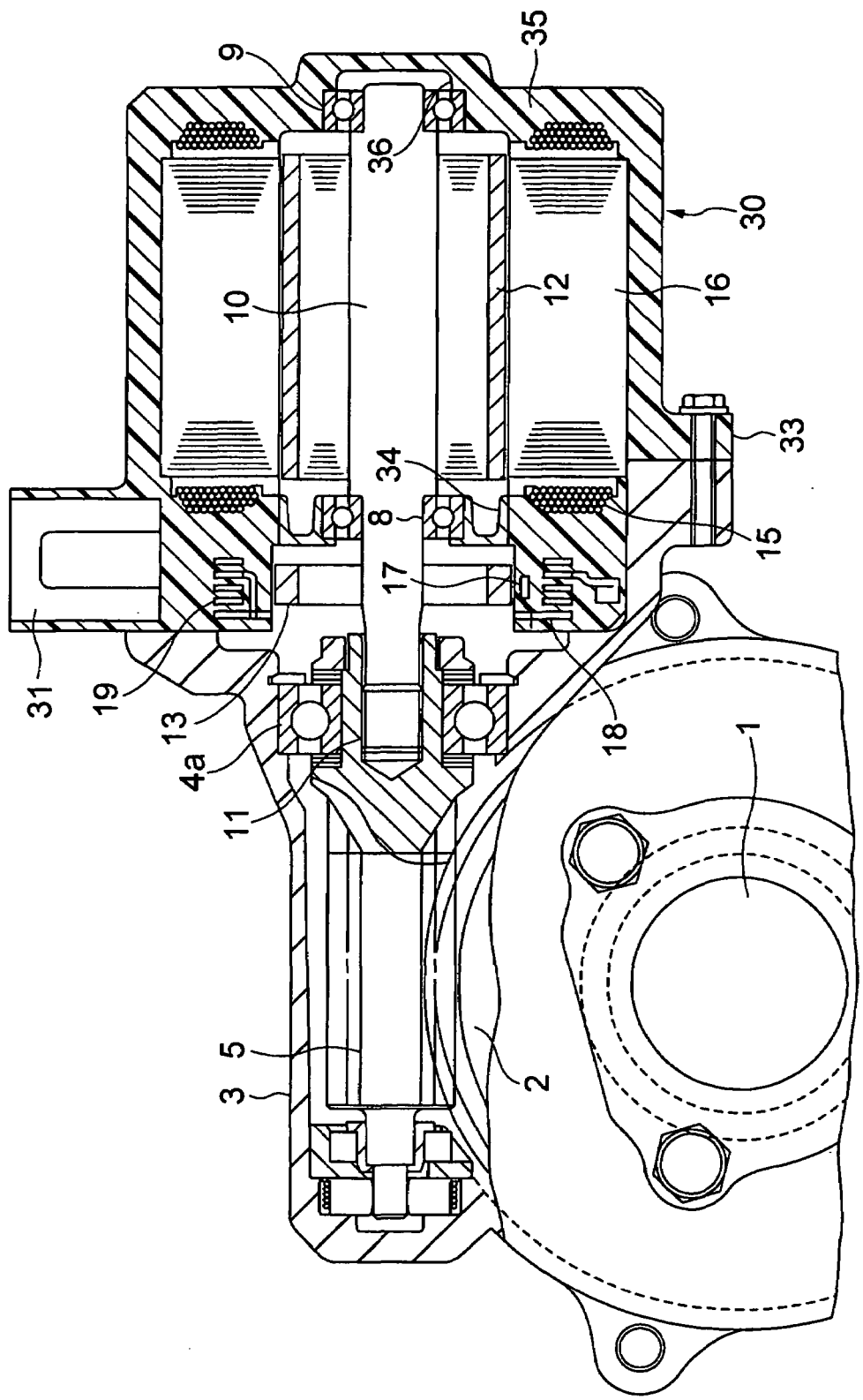
FIG. 2 is a longitudinal cross sectional view showing an electric power steering apparatus according to a second embodiment of the present invention.

FIG. 2 is a longitudinal cross sectional view of an electric power steering apparatus according to the second embodiment of the present invention.

As shown in FIG. 2, an output shaft 1 is linked with an input shaft (not shown), which is coupled to a steering wheel (not shown), by means of a torsion bar (not shown). A worm wheel 2 of a worm gear reduction mechanism (reduction gear) is fixedly mounted on the output shaft 1.

A worm 5 rotatably supported in a gear housing 3 by a bearing 4 etc. is in engagement with the worm wheel 2.

The rotor 10 of the brushless motor and the worm 5 are connected by means of a spline fitting portion 11 so that they are movable in the axial direction but non-rotatable relative to each other.

In the radially outer periphery of the rotor 10, there is provided a cylindrical permanent magnet for rotational driving 12 in such a way as to be opposed to a laminated core 15 that will be described later. In addition, a ring-shaped permanent magnet for sensing 13 (member to be detected) is also provided.

Radially inside the motor cover 7, a cylindrical stator 30 is provided. The stator 30 is formed by resin molding integrally with the laminated core 16 on which a coil 15 is wound, a hall IC 17 (detection means) that detects the magnetic field of the permanent magnet for sensing (member to be detected) 13 so as to detect the rotational angle of the rotor 10, a board 18 on which the hall IC 17 is mounted, a terminal (busbar) 19 for providing connection for the coil 15 and an electric cable connection terminal (connector) 31 for a terminal connected with the coil 15 and for a terminal for outputting a signal of the hall IC 17 (detection means). The stator 30 has a flange 33 integrally formed on its outer surface for mounting the brushless motor to the worm gear mechanism (reduction gear). The detection means and the member to be detected used for detecting the angle of the rotor 10 are not limited to the hall IC and the permanent magnet, but a resolver or an inductcoder etc. may be used.

The electric cable connection terminal (connector) 31 may be made of either the material same as the resin used in the molding or a different material. It may be molded with PBT or PA6 that is typically used for connectors and thereafter molded integrally with the stator 30.

Since the stator 30 is molded with a resin in such a way as to cover the coil 15, the laminated core 16, the hall IC (detection means) 17, the board 18 and the terminal (busbar) 19, it can also play the role of a conventional motor cover (7) made of a metal.

Therefore, the brushless motor can be mounted on the worm gear mechanism by means of the flange 33 of the stator 30, and the conventional motor cover (7) made of a metal and the mounting flange therefor can be eliminated. Thus, it is possible to reduce the number of the parts and the number of the steps in the assembly process and to reduce the manufacturing cost.

In this embodiment, a bearing 8 for rotatably supporting the worm side portion of the rotor 10 is provided radially inside the stator 30 and between the permanent magnet for rotational driving 12 and the permanent magnet for sensing 13 (member to be detected).

Specifically, the bearing 8 is mounted on the radially inner side of the stator 30 formed by resin molding by means of a cylindrical bracket 34. Alternatively, the bearing 8 may be mounted directly on the radially inner side of the stator 30 without using a bracket 34.

The stator 30 has a closing wall 35 that closes the opening on the side opposite to the worm side and retains a bearing 9 for rotatably supporting the rotor 10. Specifically, the bearing 9 is retained in such a way as to be received in a recess 36 of the closing wall 35.

Since the couple of bearings 8 and 9 for rotatably supporting the rotor 10 are supported on the stator 30 as described above, the radial gap between the laminated core 16 of the stator 30 and the rotor 10 can be kept strictly constant. Thus, it is possible to reduce transmission of vibrations etc. to ensure stable performance all the time while keeping quietness.

The bearing 8 is disposed in the space provided for preventing a malfunction between the hall IC 17 (detection means) and the coil 15. This makes it possible to reduce the length of the rotor 10 and the length of the brushless motor.

Furthermore, in the case that the bearing 8 is disposed in the space provided for preventing a malfunction between the hall IC 17 (detection means) and the coil 15 and the bearing 8 is made of a magnetic substance, the bearing 8 will form a magnetic path that confines magnetic fluxes from the coil 15, whereby effects of magnetic fluxes generated by the coil 15 exerted on the hall IC 17 (detection means) are made small and the sensitivity of the hall IC 17 (detection means) can be improved.

The inner diameter of the stator 30 formed by resin molding varies stepwise along the axial direction. Specifically, the inner diameter of the stator 30 is large at its open side (i.e. the worm side) and varies stepwise from a larger diameter to a smaller diameter toward the inner side (i.e. the side opposite to the worm side).

Accordingly, after the resin molding and hardening, the core metal of the metal mold can be pulled out without being caught, and it is possible to remove the mold smoothly.

Since the inner diameter of the stator 30 is large at its open side (the worm side) and varies stepwise from a larger diameter to a smaller diameter toward the inner side (the side opposite to the worm side), the rotor 10 with the bearing 8 mounted thereon can be inserted from the open side having the largest diameter, and ease of assembly can be improved.

Accordingly, in the assembly process, the brushless motor can be assembled to the worm gear mechanism after finishing the assembly of the brushless motor alone. Therefore, ease of assembly is not deteriorated, and it is possible to inspect the performance etc. of the brushless motor in a stand alone state.

Furthermore, since in the stator 30 formed by resin molding, the electric cable connection terminal (connector) 31 for the terminal connected with the coil 15 and the terminal for outputting a signal of the hall IC (detection means) 17 is integrally molded with resin, the operation of connecting an electric cable by soldering or other means that has been conventionally required can be eliminated, so that the number of the parts and the number of the steps in the assembly process can be reduced.

Figure 3:
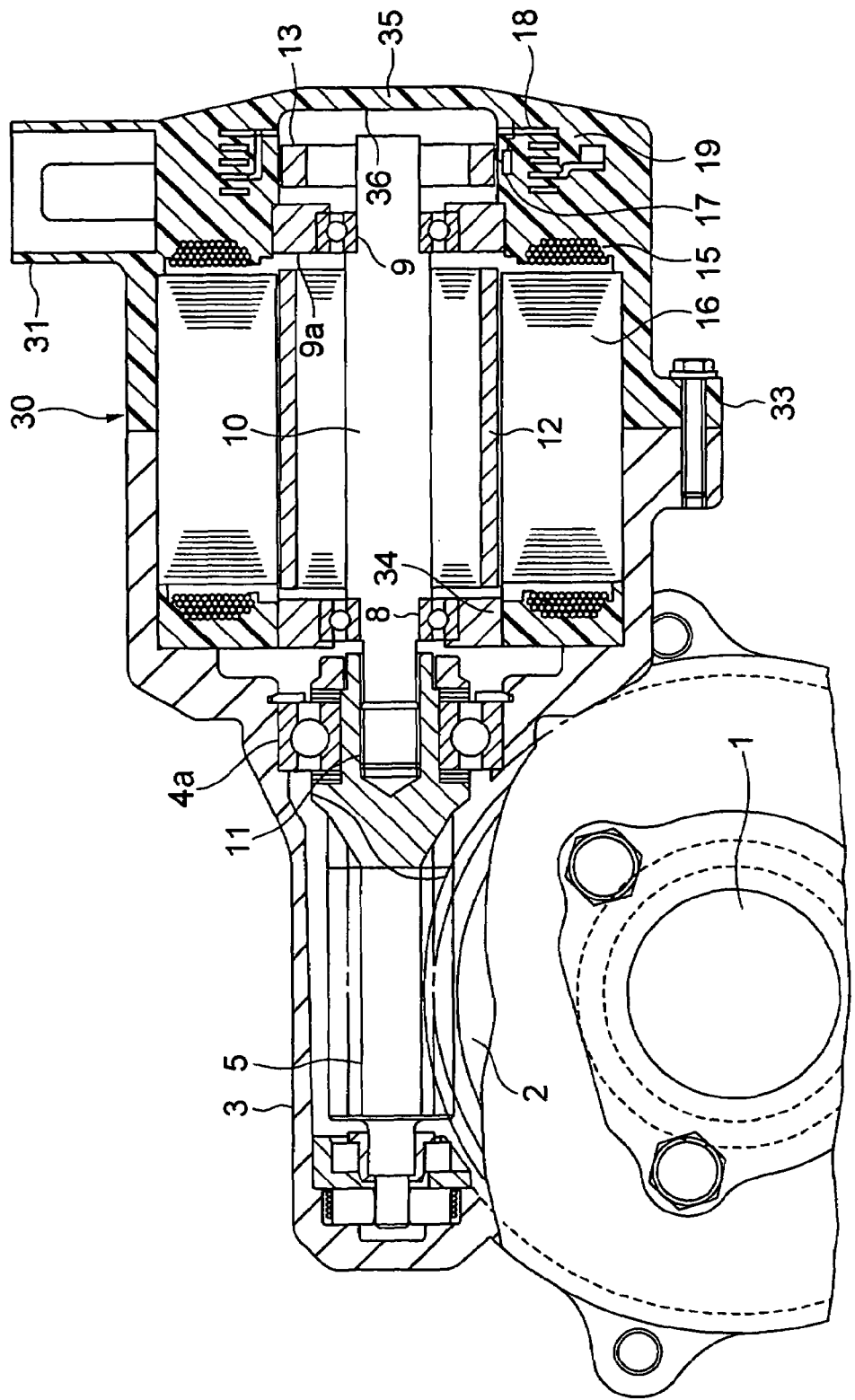
FIG. 3 is a longitudinal cross sectional view showing an electric power steering apparatus according to a third embodiment of the present invention.

FIG. 3 is a longitudinal cross sectional view of an electric power steering apparatus according to the third embodiment of the present invention.

In the third embodiment, a cylindrical stator 30 made of a resin is provided. The stator 30 is formed by resin molding integrally with the laminated core 16 on which a coil 15 is wound, a hall IC 17 (detection means) that detects the magnetic field of the permanent magnet for sensing (member to be detected) 13 so as to detect the rotational angle of the rotor 10, a board 18 on which the hall IC 17 is mounted, a terminal (busbar) 19 for providing connection for the coil 15 and an electric cable connection terminal (connector) 31 for a terminal connected with the coil 15 and for a terminal for outputting a signal of the hall IC 17 (detection means).

The hall IC (detection means) 17, the board 18, the terminal (busbar) 19 and the electric cable connection terminal (connector) 31 are provided in the thick-walled end portion of the stator 30 opposite to the motor output side end.

A bearing 9 at the side of the stator 30 that is opposite to the motor output side end is mounted in this thick-walled portion by means of a cylindrical bracket 9a.

Furthermore, the permanent motor for sensing (member to be detected) 13 is mounted on the end portion of the rotor 10 that is opposite to the motor output side end. Thus, interfering portions of the gear housing 3 and the cable connection terminal 31 are eliminated, and it is possible to make the shape simple and improve dustproof and waterproof performance, so that it is possible to prevent iron dust etc. from entering the interior during assembly of the motor. The permanent magnet for sensing (member to be detected) 13 and an end portion of the rotor 10 are received in a recess 36 of the closed wall 35.

Furthermore, the permanent motor for sensing (member to be detected) 13 is mounted on the end portion of the rotor 10 that is opposite to the motor output side end. Thus, interfering portions of the gear housing 3 and the cable connection terminal 31 are eliminated, and it is possible to make the shape simple and improve dustproof and waterproof performance, so that it is possible to prevent iron dust etc. from entering the interior during assembly of the motor.

The stator 30 has, on an outer surface thereof, a flange 33 to be attached to a reduction gear. Accordingly, the brushless motor can be mounted on the worm gear mechanism by means of the flange 33 of the stator 30, and the conventional motor cover made of a metal and the mounting flange therefor can be eliminated. Thus, it is possible to reduce the number of the parts and the number of the steps in the assembly process and to reduce the manufacturing cost.

In addition, by providing the flange 33 at a position near the center with respect to the axial direction of the stator 30, it is possible to reduce the distance between the center of gravity of the motor and the flange 33, thereby reducing forces generated in the flange 33 due to vibration and other causes. Thus, the required strength of the flange 33 can be reduced, namely its weight and size may be reduced.

Figure 4:
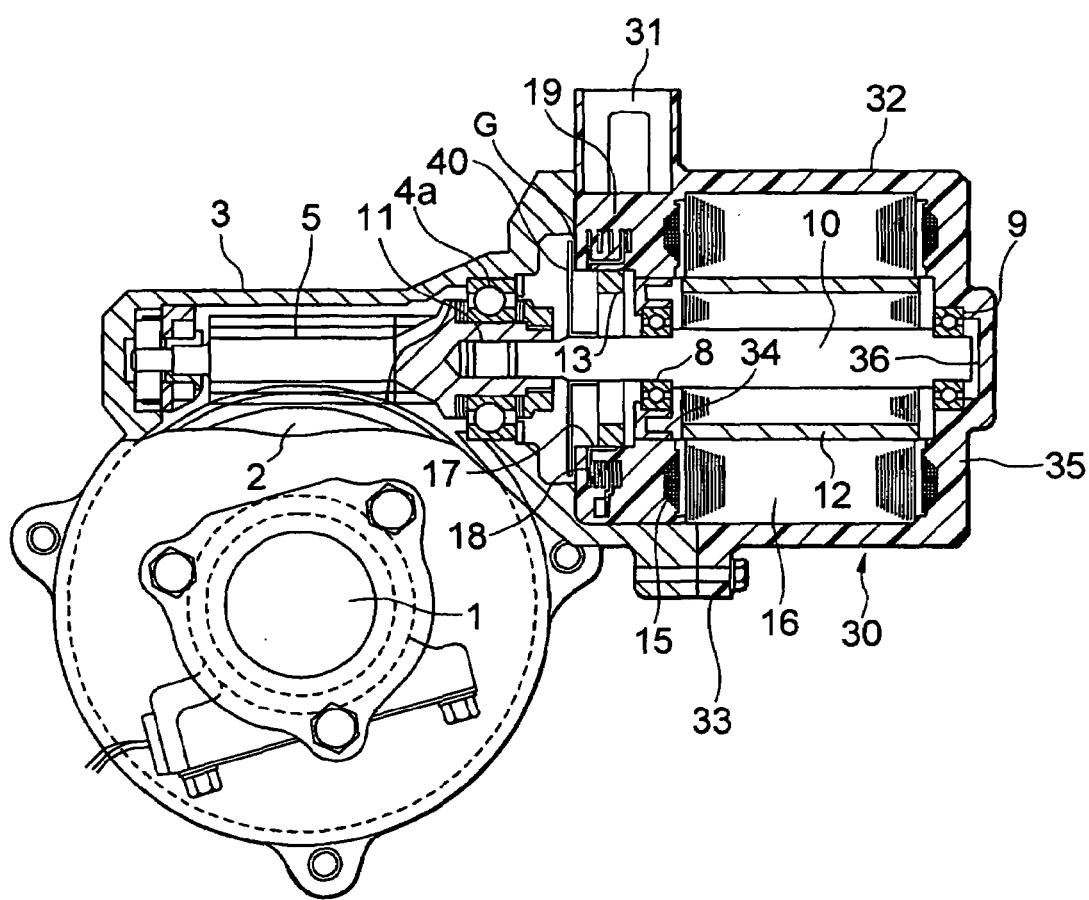
FIG. 4 is a longitudinal cross sectional view showing an electric power steering apparatus according to a fourth embodiment of the present invention.

FIG. 4 is a longitudinal cross sectional view of an electric power steering apparatus according to the fourth embodiment of the present invention.

As shown in FIG. 4, an output shaft 1 is linked with an input shaft (not shown), which is coupled to a steering wheel (not shown), by means of a torsion bar (not shown). A worm wheel 2 of a worm gear reduction mechanism (reduction gear) is fixedly mounted on the output shaft 1. The reduction gear is not limited to the worm gear reduction mechanism.

A worm 5 rotatably supported in a gear housing 3 by a bearing 4 etc. is in engagement with the worm wheel 2.

The rotor 10 of the brushless motor and the worm 5 are connected by means of a spline fitting portion 11 so that they are movable in the axial direction but non-rotatable relative to each other.

In the radially outer periphery of the rotor 10, a cylindrical permanent magnet for rotational driving 12 is provided in such a way as to be opposed to a laminated core 16 that will be described later. In addition, a ring-shaped permanent magnet for sensing 13 (member to be detected) is also provided.

Radially inside the motor cover 7, a cylindrical stator 30 is provided. The stator 30 is formed by resin molding integrally including the laminated core 16 on which a coil 15 is wound, a hall IC 17 (detection means) that detects the magnetic field of the permanent magnet for sensing (member to be detected) 13 so as to detect the rotational angle of the rotor 10, a board 18 on which the hall IC 17 is mounted, a terminal (busbar) 19 for providing connection for the coil 15, an electric cable connection terminal (connector) 31 for a terminal connected with the coil 15 and for a terminal for outputting a signal of the hall IC 17 (detection means) and a cylindrical resin housing portion 32 covering the coil 15, the laminated core 16, the hall IC 17 (detection means), the board 18 and the terminal (busbar) 19. The cylindrical resin housing portion 32 has, on an outer surface thereof, a flange 33 integrally for mounting the brushless motor to the worm gear mechanism (reduction gear). The permanent magnet for sensing and the hall IC may be replaced by a resolver or an inductcoder etc. serving as the detection means and the member to be detected.

The electric cable connection terminal (connector) 31 may be made of either the material same as the resin used in the molding or a different material. It may be molded with PBT or PA6 that is typically used for connectors and thereafter molded integrally with the stator 30.

The cylindrical resin housing portion 32 is molded integral with the coil 15, the laminated core 16, the hall IC 17, the board 18 and the terminal (busbar) 19 in such a way as to cover them. Thus, it also plays the role of a conventional motor cover (7) made of a metal.

Therefore, the brushless motor can be mounted on the worm gear mechanism by means of the flange 33 of the cylindrical resin housing portion 32, and it is possible to eliminate the conventional motor cover (7) made of a metal and its mounting flange. Thus, it is possible to reduce the number of the parts and the number of the steps in the assembly process to reduce the manufacturing cost.

In the fourth embodiment, a bearing 8 for rotatably supporting the worm side portion of the rotor 10 is provided radially inside the stator 30 and between the permanent magnet for rotational driving 12 and the permanent magnet for sensing 13.

Specifically, the bearing 8 is mounted on the radially inner side of the stator 30 formed by resin molding by means of a cylindrical bracket 34. Alternatively, the bearing 8 may be mounted directly on the radially inner side of the stator 30 without using a bracket 34.

The cylindrical resin housing portion 32 has a closing wall 35 that closes the opening on the side opposite to the worm side and retains a bearing 9 for rotatably supporting the rotor 10. Specifically, the bearing 9 is retained in such a way as to be received in a recess 36 of the closing wall 35.

Since the couple of bearings 8 and 9 for rotatably supporting the rotor 10 are supported on the cylindrical resin housing portion 32 as described above, the radial gap between the laminated core 16 of the stator 30 and the rotor 10 can be kept strictly constant. Thus, it is possible to reduce transmission of vibrations etc. to ensure stable performance all the time while keeping quietness.

The bearing 8 is disposed in the space provided for preventing a malfunction between the hall IC 17 and the coil 15. This makes it possible to reduce the length of the rotor 10 and the length of the brushless motor.

Furthermore, in the case that the bearing 8 is disposed in the space provided for preventing a malfunction between the hall IC 17 and the coil 15 and the bearing 8 is made of a magnetic substance, the bearing 8 will form a magnetic path that confines magnetic fluxes from the coil 15, whereby effects of magnetic fluxes generated by the coil 15 exerted on the hall IC 17 are made small and the sensitivity of the hall IC 17 can be improved.

The inner diameter of the stator 30 formed by resin molding varies stepwise along the axial direction. Specifically, the inner diameter of the stator 30 is large at its open side (i.e. the worm side) and varies stepwise from a larger diameter to a smaller diameter toward the inner side (i.e. the side opposite to the worm side).

Accordingly, after the resin molding and hardening, the core metal of the metal mold can be pulled out without being caught, and it is possible to remove the mold smoothly.

Since the inner diameter of the stator 30 is large at its open side (the worm side) and varies stepwise from a larger diameter to a smaller diameter toward the inner side (the side opposite to the worm side), the rotor 10 with the bearing 8 mounted thereon can be inserted from the open side having the largest diameter, and ease of assembly can be improved.

Accordingly, in the assembly process, the brushless motor can be assembled to the worm gear mechanism after finishing the assembly of the brushless motor alone. Therefore, ease of assembly is not deteriorated, and it is possible to inspect the performance etc. of the brushless motor in a stand alone state.

Furthermore, since in the stator 30 formed by resin molding, the electric cable connection terminal (connector) 31 for the terminal connected with the coil 15 and the terminal for outputting a signal of the hall IC (detection means) 17 is integrally molded with resin, the operation of connecting an electric cable by soldering or other means that has been conventionally required can be eliminated, so that the number of the parts and the number of the steps in the assembly process can be reduced.

In this fourth embodiment, since the bearing 8 is disposed in the radially inside the stator 30 and between the permanent magnet for rotational driving 12 and the permanent magnet for sensing 13, the boundary portion between the worm gear mechanism and the brushless motor is open and the worm gear mechanism and the brushless motor are in communication with each other. As a result, there is a risk that foreign matters such as iron dust and grease will enter the brushless motor.

In view of this, in the fourth embodiment, a shield member 40 for shielding the boundary between the worm gear mechanism and the brushless motor is provided. The shield member 40 is a ring-like circular plate made of a thin metal plate, which is attached to the rotor 10 of the brushless motor to rotate with the rotor 10 with a predetermined small gap G being left between it and the stator 30 of the brushless motor.

The small gap G allows the shield member 40 to rotate while achieving a sealing function for preventing entry of foreign matters and grease. Although the small gap G is formed between the stator 30 as a stationary portion of the brushless motor and the shield member 40 in this embodiment, it may be formed between the gear housing 3 as a stationary portion of the worm gear mechanism and the shield member 40.

As per the above, even if foreign matters such as iron dust and grease are about to enter the brushless motor, entry of the foreign matters and the grease can be reliably prevented by the shield member 40.

Figure 5:
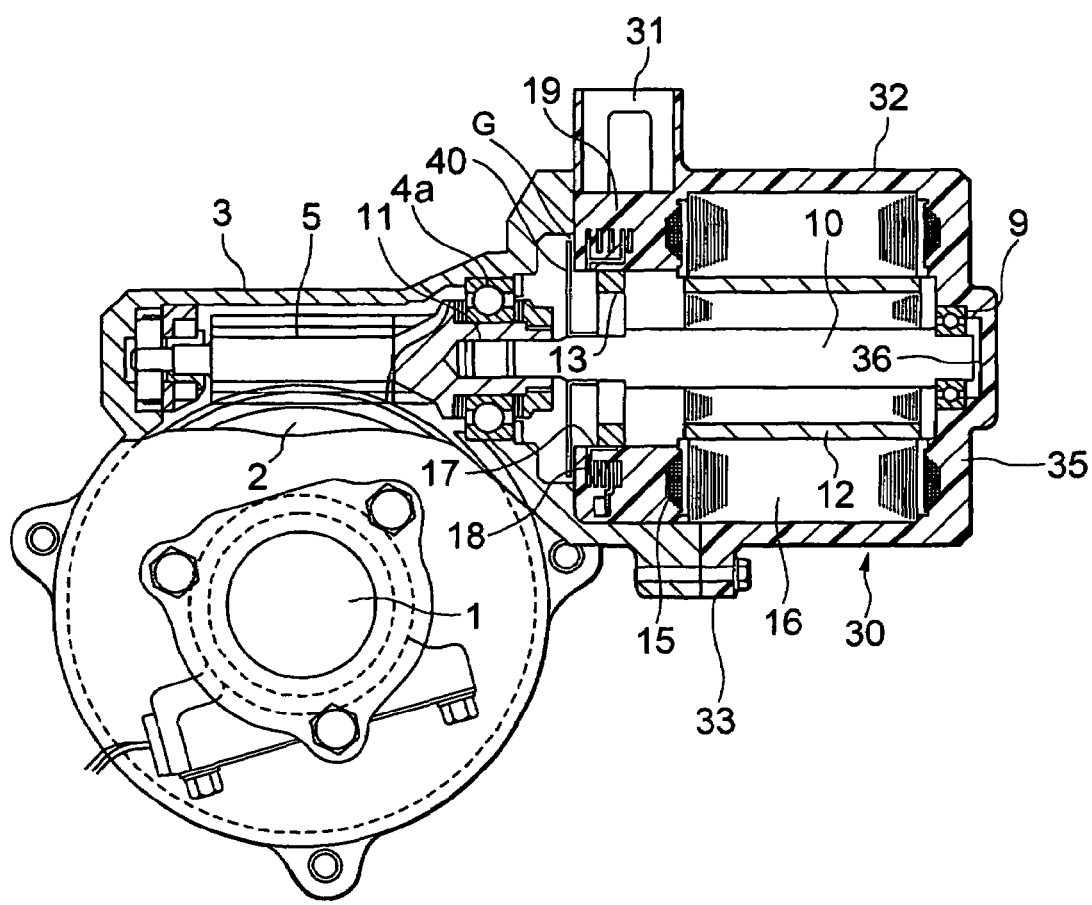
FIG. 5 is a longitudinal cross sectional view showing an electric power steering apparatus according to a fifth embodiment of the present invention.

FIG. 5 is a longitudinal cross sectional view of an electric power steering apparatus according to the fifth embodiment of the present invention.

As shown in FIG. 5, in the fifth embodiment, the bearing 8 disposed in radially inside the stator 30 and between the permanent magnet for rotational driving 12 and the permanent magnet for sensing 13 have been eliminated in order to achieve further downsizing.

In the fifth embodiment also, with the elimination of the bearing 8, the boundary portion between the worm gear mechanism and the brushless motor is open and the worm gear mechanism and the brushless motor are in communication with each other. As a result, there is a risk that foreign matters such as iron dust and grease will enter the brushless motor.

In view of this, in the fifth embodiment also, a shield member 40 for shielding the boundary between the worm gear mechanism and the brushless motor is provided. The shield member 40 is a ring-like circular plate made of a thin metal plate, which is attached to the rotor 10 of the brushless motor to rotate with the rotor 10 with a predetermined small gap G being left between it and the stator 30 of the brushless motor.

The small gap G allows the shield member 40 to rotate while achieving a sealing function for preventing entry of foreign matters and grease. Although the small gap G is formed between the stator 30 as a stationary portion of the brushless motor and the shield member 40 in this embodiment, it may be formed between the gear housing 3 as a stationary portion of the worm gear mechanism and the shield member 40.

As per the above, even if foreign matters such as iron dust and grease are about to enter the brushless motor, entry of the foreign matters and the grease can be reliably prevented by the shield member 40.

Figure 6:
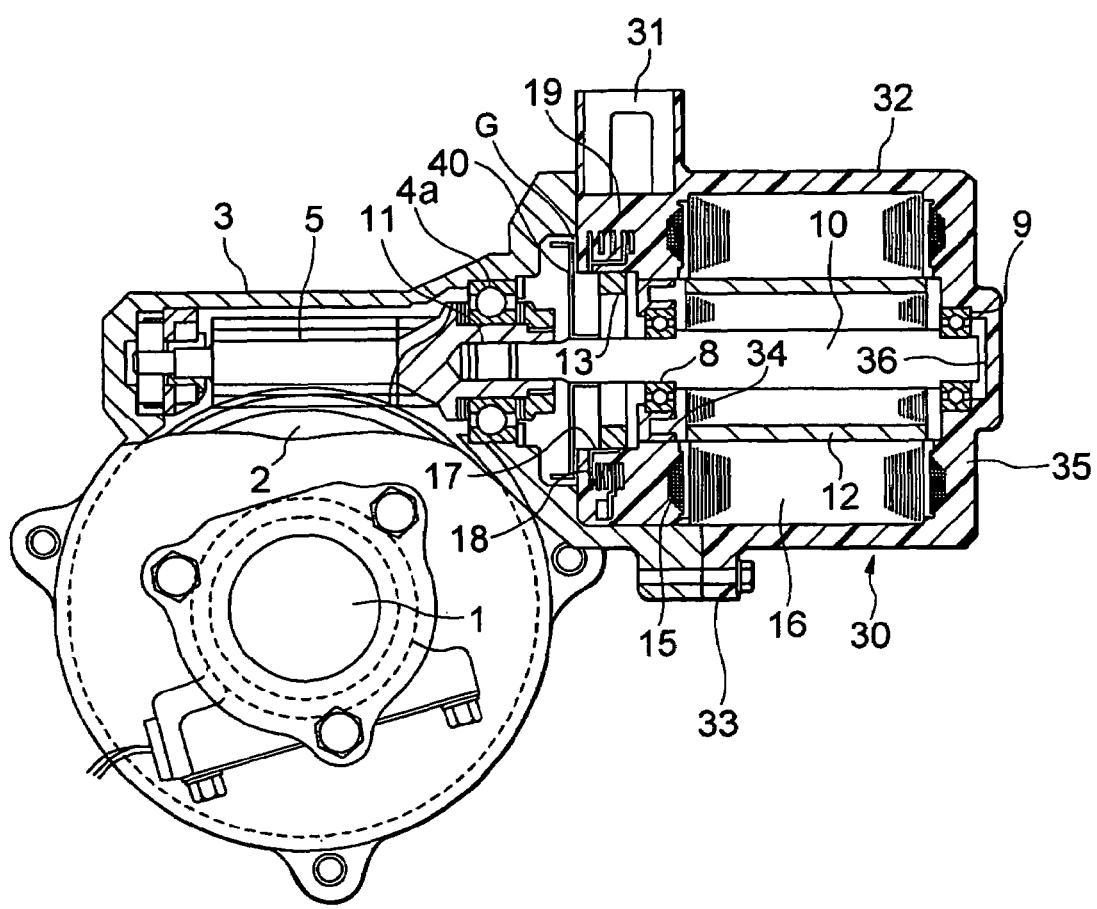
FIG. 6 is a longitudinal cross sectional view showing an electric power steering apparatus according to a sixth embodiment of the present invention.

FIG. 6 is a longitudinal cross sectional view of an electric power steering apparatus according to the sixth embodiment of the present invention.

As shown in FIG. 6, in the sixth embodiment, a bearing 8 is disposed in radially inside a stator 30 and between a permanent magnet for rotational driving 12 and a permanent magnet for sensing 13 in a manner similar to the fourth embodiment.

In this case also, the boundary portion between the worm gear mechanism and the brushless motor is open and the worm gear mechanism and the brushless motor are in communication with each other. Consequently, there is a risk that foreign matters such as iron dust and grease will enter the brushless motor.

In view of this, in the sixth embodiment also, a shield member 40 for shielding the boundary between the worm gear mechanism and the brushless motor is provided.

The shield member 40 is a ring-like circular plate made of a thin metal plate, which is attached to the rotor 10 of the brushless motor to rotate with the rotor 10 with a predetermined small gap G being left between it and the stator 30 of the brushless motor. The small gap G allows the shield member 40 to rotate while achieving a sealing function for preventing entry of foreign matters and grease.

In addition, in the sixth embodiment, the edge portion 41 of the ring-like circular shield member 40 is bent toward the axial direction.

With this feature, the small gap G is formed not only between the stator 30 as a stationary portion of the brushless motor and the shield member 40 but also between the gear housing 3 as a stationary portion of the worm gear mechanism and the edge portion 41 of the shield member 40, and therefore the sealing performance of the small gap G is further improved.

Therefore, in the sixth embodiment also, even if foreign matters such as iron dust and grease are about to enter the brushless motor, entry of the foreign matters and the grease can be reliably prevented by the shield member 40 and its edge portion 41.

In addition, since the edge portion 41 of the ring-like circular shield member 40 is bent toward the axial direction, the sealing performance of the small gap G between the gear housing 3 and the edge portion 41 can be enhanced, and particularly in the case that liquid such as grease is about to enter the brushless motor while running on the rotor 10, entry of the grease or the like can be effectively prevented by the edge portion 41.

Figure 7:
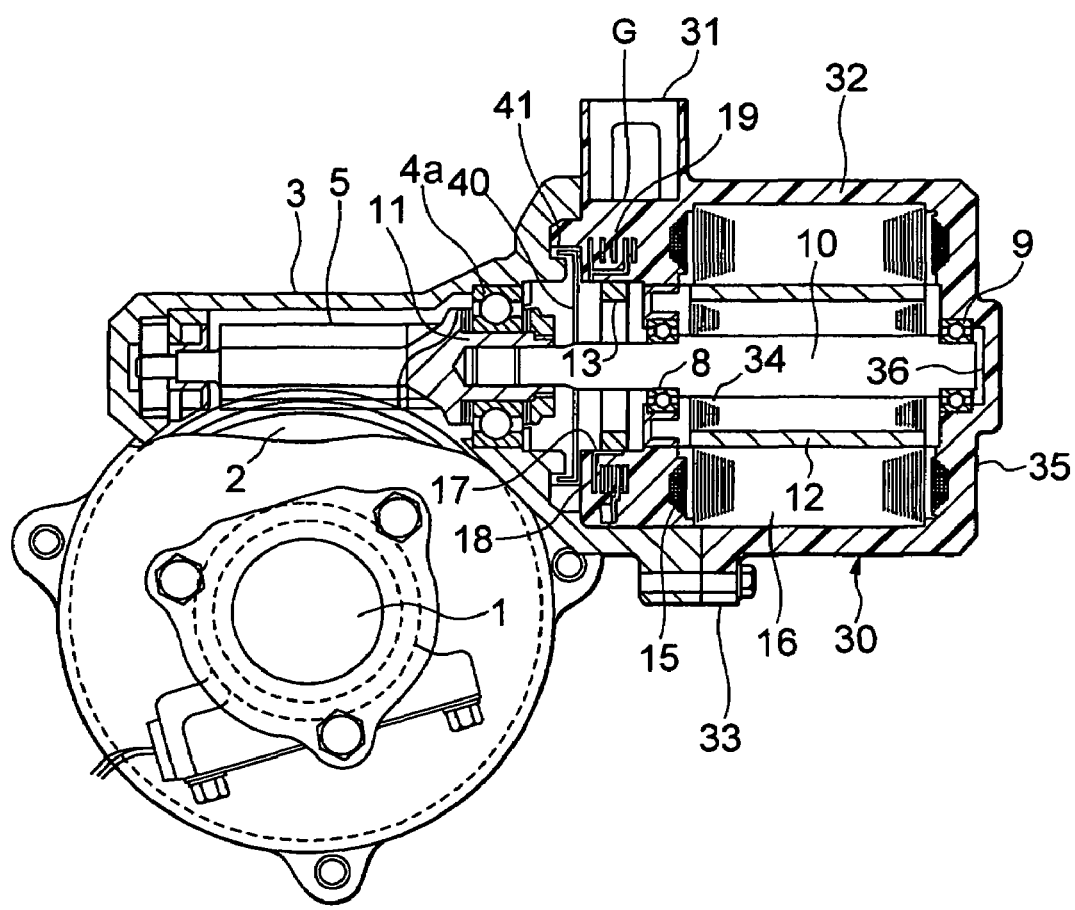
FIG. 7 is a longitudinal cross sectional view showing an electric power steering apparatus according to a seventh embodiment of the present invention.

FIG. 7 is a longitudinal cross sectional view of an electric power steering apparatus according to the seventh embodiment of the present invention.

As shown in FIG. 7, in the seventh embodiment, a bearing 8 is disposed in radially inside a stator 30 and between a permanent magnet for rotational driving 12 and a permanent magnet for sensing 13 in a manner similar to the fourth and fourth embodiments.

In this case also, the boundary portion between the worm gear mechanism and the brushless motor is open and the worm gear mechanism and the brushless motor are in communication with each other. As a result, there is a risk that foreign matters such as iron dust and grease will enter the brushless motor.

In view of this, in the seventh embodiment also, a shield member 40 for shielding the boundary between the worm gear mechanism and the brushless motor is provided.

The shield member 40 is a ring-like circular plate made of a thin metal plate, which is attached to the rotor 10 of the brushless motor to rotate with the rotor 10 with a predetermined small gap G being left between it and the stator 30 of the brushless motor. The small gap G allows the shield member 40 to rotate while achieving a sealing function for preventing entry of foreign matters and grease.

In addition, in the seventh embodiment, the edge portion 41 of the ring-like circular shield member 40 is bent toward the axial direction, and the edge portion 41 of the shield member 40, the stator 30 of the brushless motor and the gear housing 3 of the worm gear mechanism forms, in cooperation, a predetermined small gap G therebetween that has a labyrinth effect.

Thus, it is possible to improve the sealing performance of the small gap G further, and in this embodiment also, even if foreign matters such as iron dust and grease are about to enter the brushless motor, entry of the foreign matters and the grease can be reliably prevented by the shield member 40 and its edge portion 41.

Furthermore, since the edge portion 41 of the ring-like circular shield member 40 is bent toward the axial direction, and the edge portion 41 of the shield member 40, the stator 30 of the brushless motor and the gear housing 3 of the worm gear mechanism forms, in cooperation, the small gap G therebetween that has a labyrinth effect, it is possible to enhance the sealing performance of the small gap G between the gear housing 3 and the edge portion 41 further. In particular, in the case that liquid such as grease is about to enter the brushless motor while running on the rotor 10, entry of the grease or the like can be effectively prevented by the edge portion 41.

In the following, the eighth embodiment will be described in detail.

Figure 8:
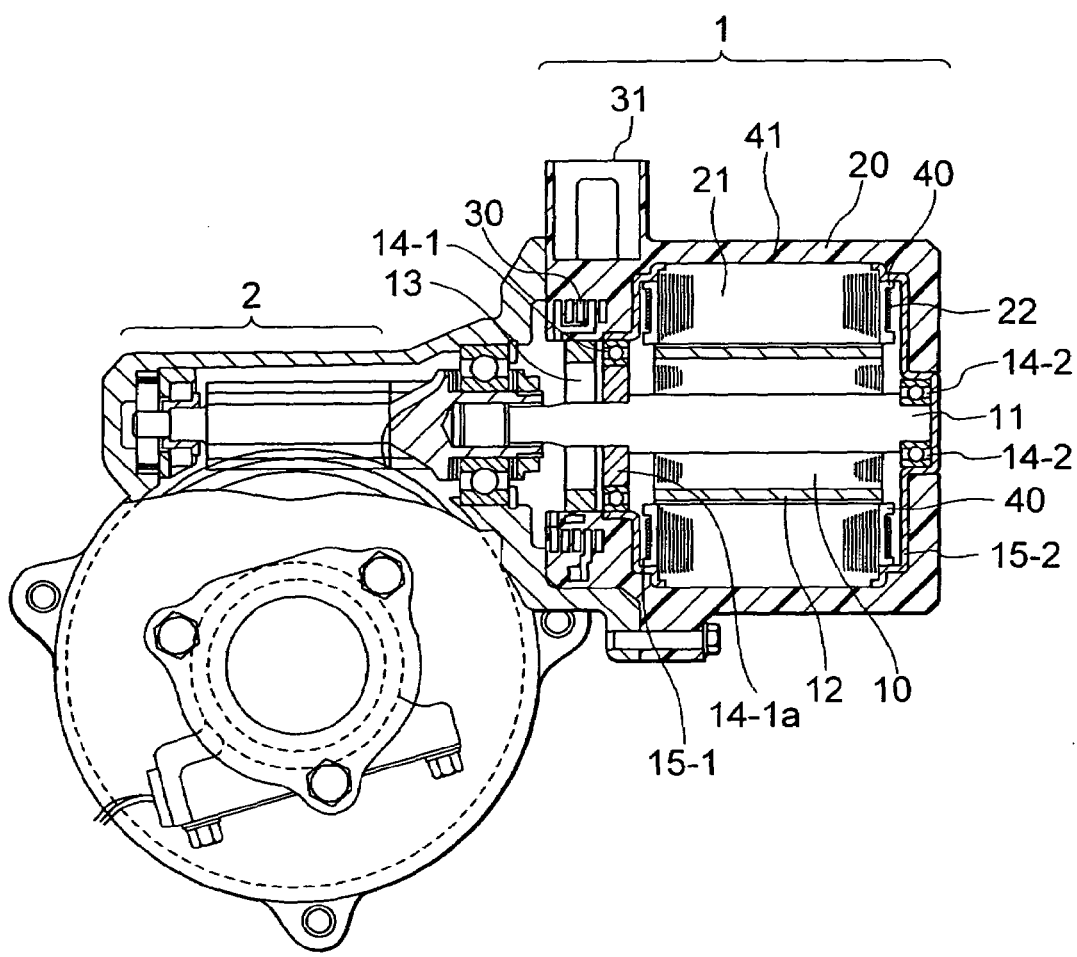
FIG. 8 is a longitudinal cross sectional view showing an electric power steering apparatus according to an eighth embodiment of the present invention.

This embodiment is an example in which the bearings of the rotor are provided at two positions, and the description thereof will be made with reference to FIGS. 8, 9, 10A to 10C and 11A to 11C. FIG. 8 is a longitudinal cross sectional view showing a brushless motor of an electric power steering apparatus.

The brushless motor as a whole is composed of a brushless motor portion (which will be referred to as the motor hereinafter) 1 and a worm portion 2. For explanatory purposes, the side of the motor portion 1 that is close to the worm portion 2 will be referred to as the front side, and the side that is far from the worm portion 2 will be referred to as the rear side. The motor portion 1 is mainly composed of a rotor 10 and a stator 20. The rotor 10 has a cylindrical structure having a rotor shaft 11 at the center and a permanent magnet 12 attached on its outer circumferential surface. A permanent magnet 13 for a sensor for detecting the rotational position is attached on the rotor shaft 11. The stator 20 has a cylindrical structure composed of a stator core 21 and windings 22 wound around it with an insulating member 40 therebetween. The stator 20 is accommodated in a housing 41. The rotor 10 rotates in the state inserted in the stator 20. In this case, it is necessary to support the rotor shaft 11 in such away that it can rotate smoothly without being in touch with the stator 20. To this end, in this embodiment, the rotor shaft 11 is supported, on a front side bearing support member 15-1 via a cylindrical metal member 14-1a and a bearing 14-1 at the front side, and on the rear side bearing support member 15-2 via a bearing 14-2 at the rear side. Each of the front side and rear side bearing support members 15-1 and 15-2 is supported by the stator 20.

These bearing support members 15-1 and 15-2 are provided in order to fix the bearing members 14-1, 14-1a and 14-2 to the stator 20 with correct positional relationship thereto, and each bearing support member has a portion fitted to and supported by the stator 20 and a portion for supporting the bearing 14-1, 14-2 at the radially central position. The center line of the cylinder of the stator 20 and the center line of the bearings 14-1 and 14-2 are adapted to coincide on the same axis. In the front side bearing 14-1, the inner ring and the cylindrical member 14-1a may be integrally constructed.

Figure 9:
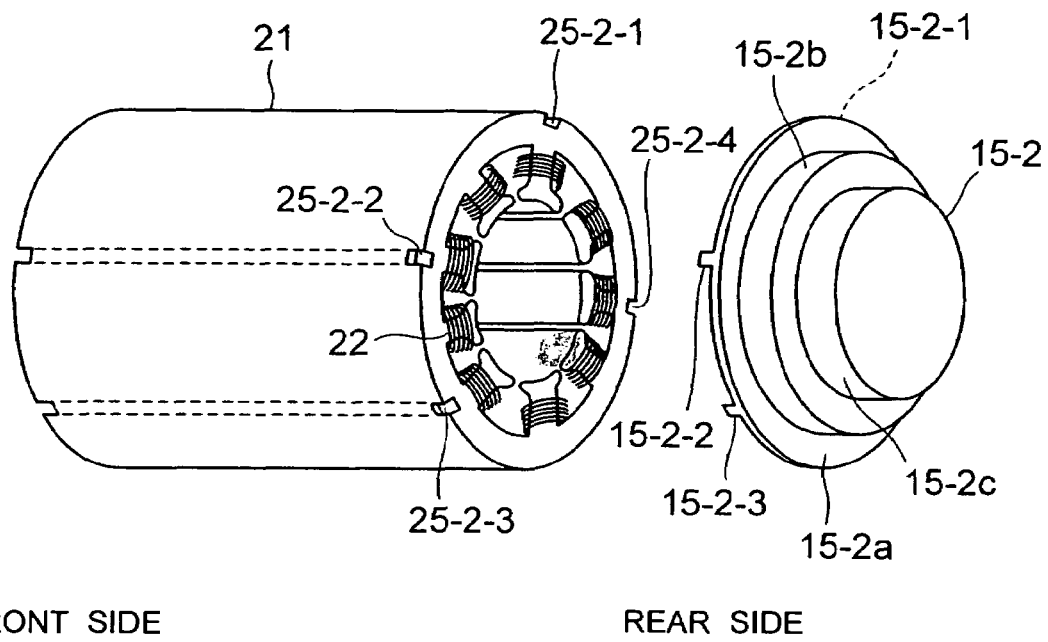
FIG. 9 a perspective view showing how a stator core a rear side bearing support member is assembled in the eighth embodiment.

FIG. 9 is a perspective view showing how the rear side bearing support member 15-2 and the stator core 21 are fitted to each other.

Figures 10A, 10B, 10C:
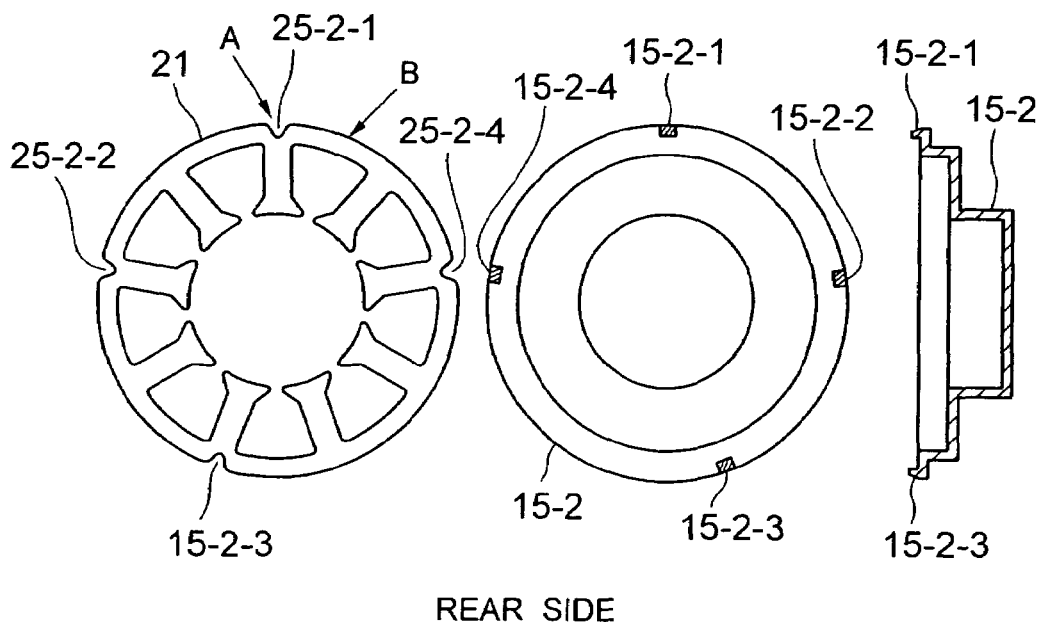
FIGS. 10A to 10C show the rear side bearing support member and the stator core in the eighth embodiment.

FIG. 10A is a front view of the stator core 21, FIG. 10B is a rear view of the rear side bearing support member 15-2, and FIG. 10C is a diametral cross sectional view of the bearing support member 15-2. On the outer circumference of the stator core 21, four notches 25-2-1, 25-2-2, 25-2-3 and 25-2-4 are formed at equal intervals along the circumferential direction. The bearing support member 15-2 is integrally composed of a flat annular portion 15-2a having the same diameter and the same size as the annular portion of the stator core 21 and to be in close contact with the annular portion, a first cylindrical portion 15-2b extending axially outwardly from the radially inner portion of the annular portion 15-2a and a second cylindrical portion having a bottom 15-2c further extending axially outwardly from the radially inner, bottom side of the first cylindrical portion 15-2b. Both the first and second cylindrical portions are formed coaxially with the stator core 21. The bearing 14-2 is supported on the inner circumference of the second cylindrical portion 15-2c. On the radially outer side of the annular portion 15-2a of the bearing support member 15-2, four bosses 15-2-1, 15-2-2, 15-2-3 and 15-2-4 to be fitted respectively to the four notches 25-2-1, 25-2-2, 25-2-3 and 25-2-4 of the stator core 21 are provided, and the bearing support member 15-2 is fixedly supported on the stator core 21 in position by the fitting of these portions. Accordingly, even if drying shrinkage occurs upon molding of the stator core 21, the coaxiality of the bearing 14-2 and the stator core 21 is maintained adequately.

On the other hand, the bearing support member 15-1 also includes an annular portion 15-1a to be in close contact with the front side annular portion of the stator core 21, a first cylindrical portion 15-1b having a medium diameter and a second cylindrical portion 15-1c having the least diameter, all of which portions are integral and coaxial with each other. The second cylindrical portion 15-1c has a through hole and supports the shaft 11 via the bearing 14-1. How the bearing support member 15-1 is supported on the stator core 21 will be described later with reference to FIGS. 11A to 11C.

As per the above, the bearing support member 15-2 and the stator core 21 are fixedly secured with correct positional relationship, and even if drying shrinkage of the mold occurs, the coaxiality of the bearing 14-2 and the stator core 21 is maintained adequately.

The material of the bearing support member 15-1 and 15-2 is required to have a certain degree of rigidity so that it will not deform through drying shrinkage in molding etc. Specifically, an iron material or an aluminum material should be used. In addition, there is no problem in applying the present invention to the bearing support members 15-1, 15-2 made of a resin-based material such as an engineering plastic, provided that it has such a rigidity that can endure high temperatures and drying shrinkage upon molding. The description on the material of the bearing support member applies also to that of the bearing support members 16-1, 16-2, 17-1 and 17-2 that will be described later.

The notches are factors that change the shape of the stator core 21, and they have an influence on the magnetic fluxes that pass through the stator core 21. In view of this, the notches should be set at positions at which they do not affect the magnetic fluxes of the stator core 21, as far as possible. In FIG. 10A, each notch 25-2-1, 25-2-2, 25-2-3, 25-2-4 is set at a position on the outer circumference of the stator core 21 at which an extension of the center line of a tooth pass (i.e. position A in FIG. 10A). If, for example, it is set at an intermediate position between teeth (position B in FIG. 10A), the width of the magnetic path decreases and a significant influence on the magnetic fluxes passing occurs. On the other hand, if it is set at position A, a magnetic path can be preserved by the tooth portion that is present in the inner side, and the influence can be kept small.

As to the number of the stator core elements 21 on which the notches are to be made, the notches may be formed only on such a number of the stator core elements 21 that allow fitting of the bosses of the bearing support members on the front and rear sides of the stator 20, or alternatively, the notches may be formed on all of the stator core elements 21 to avoid inconvenience in their production that may caused by the existence of two types of stator core elements, one having the notches and the other not. To Explain this with reference to FIG. 9, the notch 25-2-2 may be formed only on a certain number of stator core elements 21 in which the boss 15-2-2 is to be fitted, namely the notch may be formed on several numbers of stator core elements at both the rear and front sides that are shown by solid lines, or alternatively, the notch may be formed on all of the stator core elements 21 as shown by broken lines. This also applies to the other notches 25-2-1, 25-2-3 and 25-2-4 shown in FIG. 9. The description on the number of the stator core elements on which the notches are to be formed applies not only to the notches 25-2-1, 25-2-2, 25-2-3, 25-1-1, 25-1-2, 25-1-3 shown in FIGS. 9, 10A to 10C and 11A to 11C but also to notches 26-2-1, 26-2-2, 26-2-3, 26-1-1, 26-1-2, 26-1-3 in FIGS. 12A to 12C and 13A to 13C that will be described later.

Figures 11A, 11B, 11C:
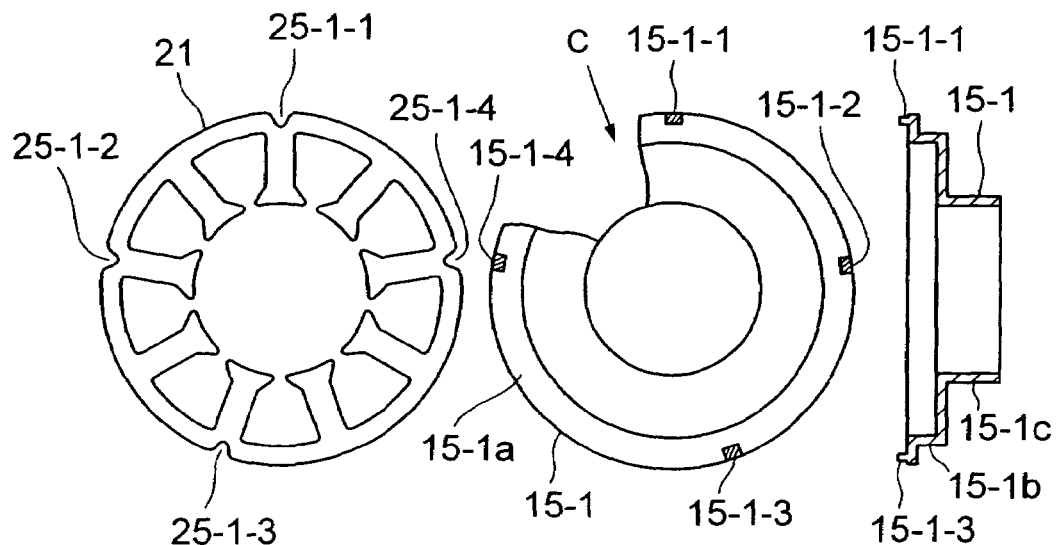
FIGS. 11A to 11C show a front side bearing support member and the stator core in the eighth embodiment.

FIGS. 11A to 11C show the front side bearing support member 15-1, the stator core elements 21 and their fitting means. Referring to FIG. 11B, the bearing support member 15-1 has a large cutaway portion C, which is formed for the following reason. In order to supply the motor with electric power, it is necessary to connect an electric cable to the windings 22 of the stator 20 via a connector 31 and a busbar 30, and the cutaway portion C is formed to provide a space for introducing the electric cable. When the bosses 15-1-1, 15-1-2, 15-1-3 and 15-1-4 and the notches 25-1-1, 25-1-2, 25-1-3 and 25-1-4 are fitted respectively, the bearing support member 15-1 and the stator core 21 are fixedly secured with correct positional relationship in a similar manner as the rear side, and the coaxiality of the bearing 14-1 and the stator core 21 can be maintained even if drying shrinkage of the mold etc. occurs.

As per the above, thanks to the effect of the front side bearing support member 15-1 and the rear side bearing support member 15-2, the center line of the rotor shaft 11 and the center line of the stator 20 are set on the same axis correctly, namely the center line of the rotor 10 and the center line of the stator 20 are set on the same axis correctly. The number of the bosses and notches is not limited to four, which is the number in the embodiment, so long as the stator core and the bearing support members are fixed with correct positional relationship.

According to the eighth embodiment, if the stator is molded, the stator and the rotor are assembled with their center lines being coaxially aligned by virtue of the effect of the bearing support members, so that generation of cogging torque and friction torque caused due to insufficiency in the coaxiality of the rotor 10 and stator 20 can be suppressed to the minimum level, and advantageous effects such as good steering wheel operation feeling and low motor noise can be achieved.

Figures 12A, 12B, 12C:
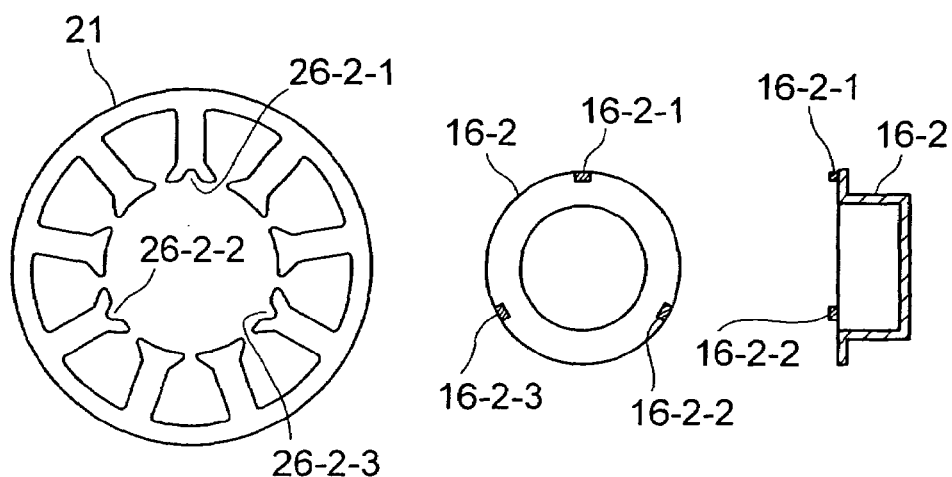
FIGS. 12A to 12C show a rear side bearing support member and a stator core according to a first modification of the eighth embodiment.
Figures 13A, 13B, 13C:
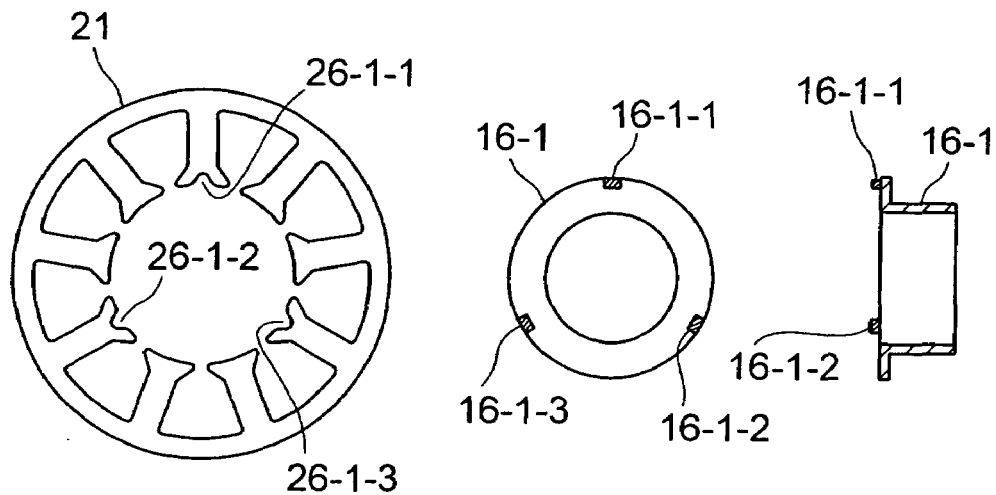
FIGS. 13A to 13C show a front side bearing support member and the stator core according to a first modification of the eighth embodiment.
Figures 14A, 14B, 14C:
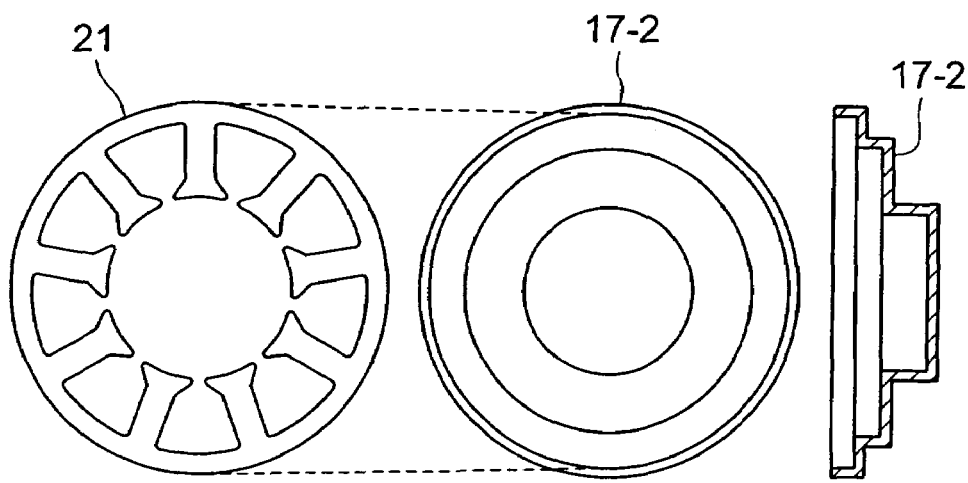
FIGS. 14A to 14C show a rear side bearing support member and a stator core according to different modification of the eighth embodiment.
Figures 15A, 15B, 15C:
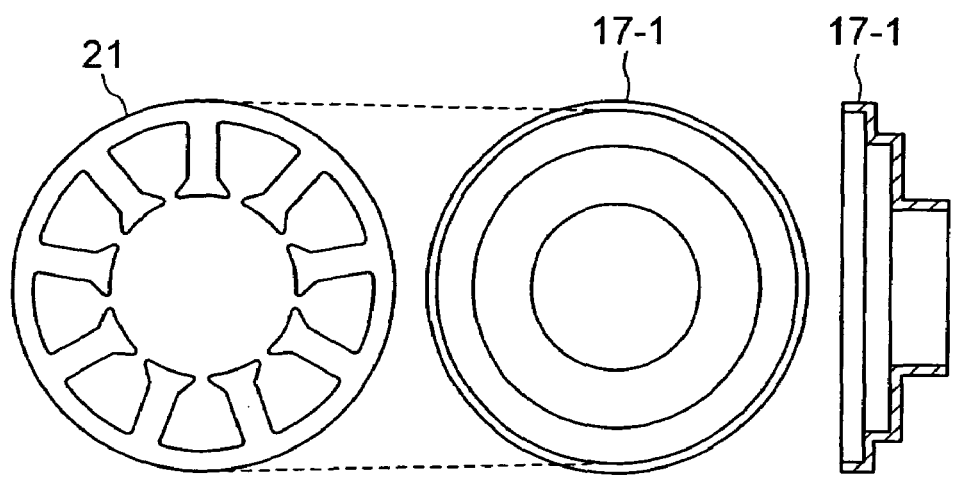
FIGS. 15A to 15C show a front side bearing support member and the stator core according to the different modification of the eighth embodiment.
Figure 16:
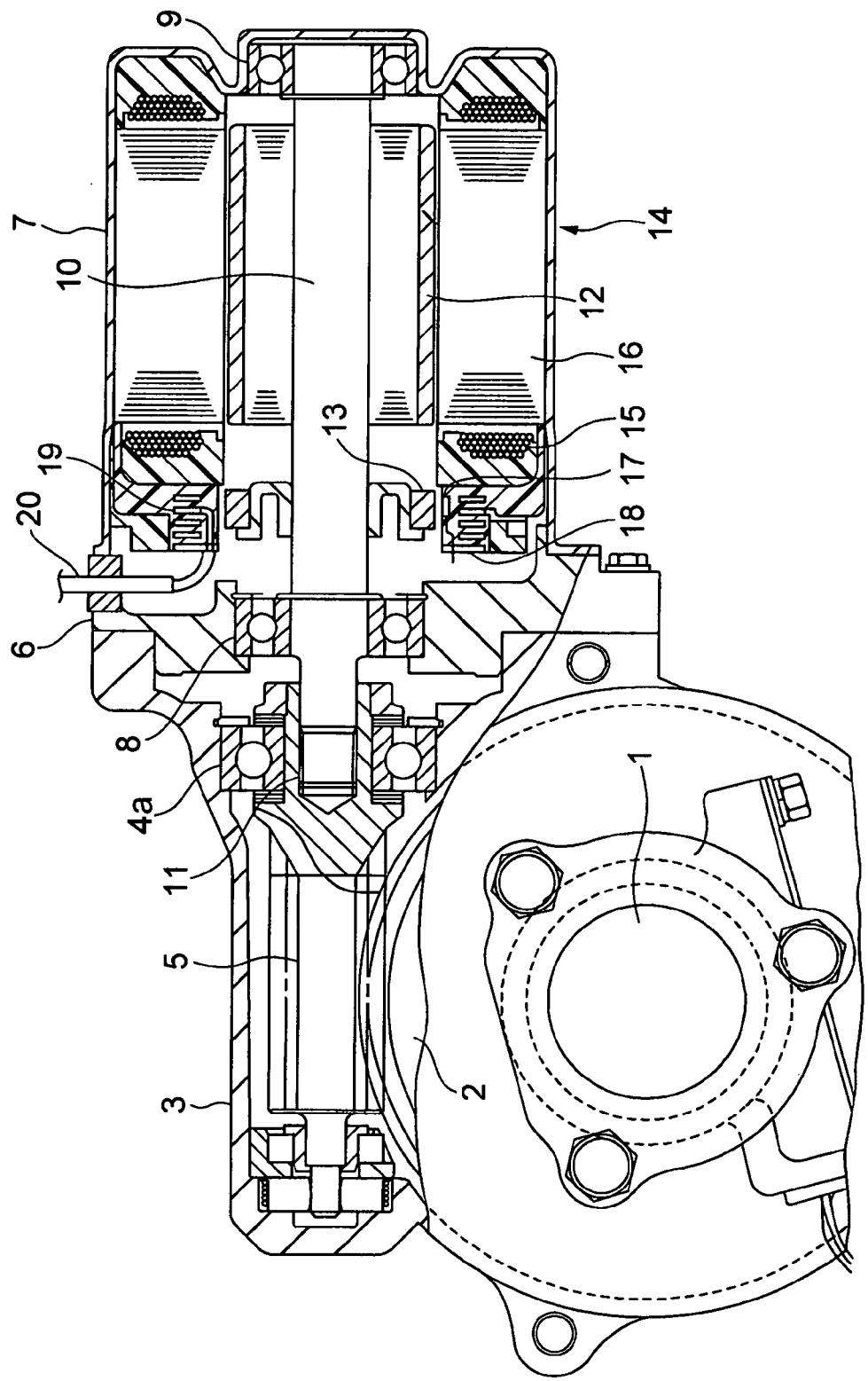
FIG. 16 is a longitudinal cross sectional view showing an conventional electric power steering apparatus.
Figure 17A:
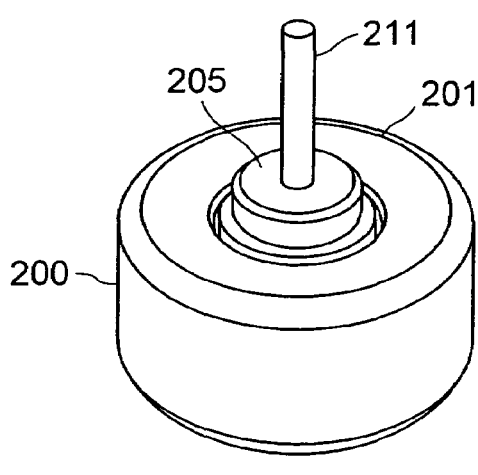
FIGS. 17A and 17B show a conventional motor for a ventilator formed by molding.
Figure 17B:
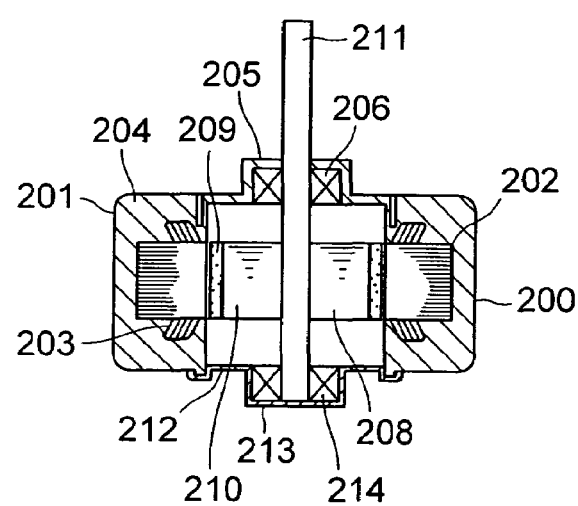

FIGS. 12A to 12C and FIGS. 13A–13C show a modification of the eighth embodiment. In this modification, the bearing support member is small-sized and structured to be attached to the inner circumference of the stator core. FIGS. 12A to 12C show the shape of the rear side bearing support member 16-2, the positions at which the bosses are formed (namely, bosses 16-2-1, 16-2-2, 16-2-3) and the positions of the notches on the stator core 21 corresponding to the aforementioned bosses (namely, notches 26-2-1, 26-2-2, 26-2-3). On the other hand, FIGS. 13A to 13C show the front side bearing support member 16-1 and the bosses 16-1-1, 16-1-2, 16-1-3. On the stator core 21, notches 26-1-1, 26-1-2 and 26-1-3 corresponding to the aforementioned bosses are formed. By using the bearing support member according to this modification also, it is possible to fix the bearings 14-1 and 14-2 to the stator 20 at correct positions, and high coaxiality of the rotor 10 and the stator 20 is achieved. This leads to the advantageous effects of preventing generation of cogging torque and friction torque due to low coaxiality and achieving good steering wheel operation feeling and low motor noise.

Although the descriptions have been made with reference to the eighth embodiment shown in FIGS. 10A to 10C and 11A to 11C in which the notches are formed on the outer circumference and the modification shown in FIGS. 12A to 12C and 13A to 13C in which the notches are formed on the inner circumference, the positions at which the notches are formed is not limited to edges such as the outer circumference and the inner circumference, but it is apparent that the same effects can be achieved even if the notches are formed at positions on the end face of the stator core 21 close to the outer circumference or at positions on the end face close to the inner circumference so as to be fitted with the bosses of the bearing support member.

FIGS. 14A to 14C and 15A to 15C show another modification of the eighth embodiment. This modification is an example in which notches and bosses are not used in fixing the positional relationship between the bearing support members 17-1 and 17-2 and the stator 20. Since all of the cylindrical stator 20, the cylindrical rotor 10, the rotor shaft 11 and the bearings 14-1 and 14-2 have circular cross sections, their coaxiality is not deteriorated when displacement in the circumferential direction occurs. Therefore, in the case that the cross sections of the bearing support members 17-1, 17-2 are circular and the inner diameters of the bearing support members 17-1, 17-2 and the outer diameter of the stator core 21 are equal while allowing their fitting, when the bearing support members 17-1 and 17-2 are fitted to the stator core 21, coaxiality of the stator 20 and the rotor 10 will not be deteriorated even if circumferential displacement of the stator core 21 and the bearing support members 17-1 and 17-2 occurs at the time of molding. In any event, appropriate coaxiality of the stator 20 and the rotor 10 can be achieved, and therefore, advantageous effects such as prevention of cogging torque and friction torque due to low coaxiality, good steering wheel operation feeling and low motor noise can be achieved by using this modification too.

The bearing support members described in the eighth embodiment and its modifications may be freely used in combination as the front and rear side bearing support members, since the front side and rear side bearing support members may be selected independently from each other. For example, a combination of the bearing support member 15-2 shown in FIGS. 10A to 10C in the rear side and the bearing support member 16-1 shown in FIGS. 13A to 13C in the front side may be used.

Although two bearing support members are employed in the eighth embodiment and its modifications, one bearing support member may be set only in the rear side as the bearing support member 15-2 or only in the front side as the bearing support member 15-1. In these cases, its contribution to the coaxiality is smaller than in the case in which two bearing support members are used but much larger than in the conventional arrangement in which no bearing support member is employed.

As has been described in the above, according to the brushless motor of the eighth embodiment and its modifications, coaxiality of the rotor and the stator is enhanced while improving heat radiation characteristics, and it can advantageously provide an electric power steering apparatus in which motor noise is low, generation of cogging torque and friction torque is suppressed to a low level and good steering wheel operation feeling is achieved even at the time when the motor is required to rotate in forward and backward directions with a large torque such as when the steering wheel is turned in one direction then the other upon driving the vehicle to a parking space or when the steering wheel is turned quickly at a critical moment.

What is claimed is:

1. An electric power steering apparatus that generates an auxiliary steering torque by a brushless motor in response to a steering torque applied on a steering wheel and transmits the auxiliary steering torque to an output shaft of a steering mechanism through a reduction gear mechanism, comprising:
    a rotor to which a cylindrical permanent magnet for rotational driving and a detection member to enable detection of a rotational angle of said rotor are attached;
    a molded resin stator member having a cylindrical portion opposed to said rotor, said stator member having, integrally molded therein, laminated core on which a coil is wound, a detection device which detects the rotational angle of said rotor by detection of said detection member, and a terminal providing connection to the coil; and
    two bearings rotatably supporting said rotor within opposite axial end portions of said stator member,
    each bearing being disposed radially inside of and supported by said stator member, and one of said bearings also being disposed between said permanent magnet and said detection member, and
    said stator member having, on its outer surface, a flange mounted to a mounting portion of a housing for said reduction gear mechanism, said flange being axially displaced from an end of said stator member in a direction away from said reduction gear mechanism such that a portion of said stator member is disposed radially inwardly of said mounting portion of said housing.

2. An electric power steering apparatus according to claim 1, wherein the inner diameter of said stator member varies stepwise along the axial direction.

3. An electric power steering apparatus according to claim 1, wherein said stator member integrally includes an electric cable connection terminal.

4. An electric power steering apparatus according to claim 1, wherein said detection member is disposed on an end portion of the rotor that is opposite to a motor output side end portion.

5. An electric power steering apparatus according to claim 1, wherein said stator member has a closing wall that closes an opening at the side opposite to the reduction gear mechanism and in which the other bearings is supported.

6. An electric power steering apparatus according to claim 1, further comprising a shield member shielding a boundary portion between said reduction gear mechanism and said motor, the shielding member being attached to said rotor of said motor to rotate with said rotor and leaving a predetermined small gap between it and a stationary portion of said motor or said reduction gear mechanism.

7. An electric power steering apparatus according to claim 6, wherein said shield member and the stationary portion of said motor or said reduction gear mechanism forms, in cooperation, a predetermined small gap therebetween that has a labyrinth effect.

8. An electric power steering apparatus according to claim 1, wherein said flange of said stator is disposed substantially centrally along a length of said coil in an axial direction of said stator member.

9. An electric power steering apparatus according to claim 1, wherein said flange of said stator member is disposed substantially centrally between said two bearings in an axial direction of said stator member.

* * * * *